United States Patent
Chen et al.

(10) Patent No.: US 12,353,707 B2
(45) Date of Patent: Jul. 8, 2025

(54) MULTI-SCREEN COCKPIT DISPLAY SYSTEM

(71) Applicant: AUO Corporation, Hsin-Chu (TW)

(72) Inventors: Yu-Chi Chen, Hsin-Chu (TW); Chia-Sheng Cheng, Hsin-Chu (TW); Chi-Yu Liu, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 0 days.

(21) Appl. No.: 18/392,140

(22) Filed: Dec. 21, 2023

(65) Prior Publication Data

US 2024/0385746 A1 Nov. 21, 2024

Related U.S. Application Data

(60) Provisional application No. 63/467,416, filed on May 18, 2023.

(30) Foreign Application Priority Data

Aug. 30, 2023 (TW) .................................. 112132884

(51) Int. Cl.
*G06F 3/04886* (2022.01)
*B60K 35/22* (2024.01)
(Continued)

(52) U.S. Cl.
CPC .......... *G06F 3/04886* (2013.01); *B60K 35/22* (2024.01); *B60K 35/235* (2024.01);
(Continued)

(58) Field of Classification Search
CPC .. G06F 3/04886; G06F 3/013; G06F 3/04817; G06F 3/04845; G06F 3/1432;
(Continued)

(56) References Cited

U.S. PATENT DOCUMENTS

| 2010/0064259 | A1* | 3/2010 | Alexanderovitc | .. G06F 3/04815 |
| | | | | 715/852 |
| 2016/0368417 | A1* | 12/2016 | Bassi | ..................... B60K 35/10 |
| 2019/0051233 | A1* | 2/2019 | Kweon | .................. G02B 3/005 |

FOREIGN PATENT DOCUMENTS

| CN | 208188811 U | 12/2018 |
| CN | 113173072 A | 7/2021 |

(Continued)

OTHER PUBLICATIONS

Office Action issued by (TIPO) Intellectual Property Office Ministry of Economic Affairs R.O.C. on Sep. 20, 2024 for Application No. 112132884, Tawian.

*Primary Examiner* — Robert J Michaud
(74) *Attorney, Agent, or Firm* — Tim Tingkang Xia, Esq.; Troutman Pepper Locke LLP

(57) ABSTRACT

A multi-screen cockpit display system is suitable for being installed in a cockpit, and includes a first display device, at least two head-up display devices and a control unit. The first display device is disposed in front of a driver's seat in the cockpit, and is suitable for displaying a first dynamic information. The at least two head-up display devices are disposed above the first display device, and are suitable for displaying a second dynamic information on a see-through window of the cockpit. The control unit is electrically connected to the first display device and the at least two head-up display devices. The control unit is suitable for providing the first and second dynamic information to the first display device and the at least two head-up display devices according to an operating state of the cockpit. Another multi-screen cockpit display system with an eye tracking module is also provided.

20 Claims, 26 Drawing Sheets

(51) Int. Cl.
*B60K 35/235* (2024.01)
*G06F 3/01* (2006.01)
*G06F 3/04817* (2022.01)
*G06F 3/04845* (2022.01)
*G06F 3/14* (2006.01)

(52) U.S. Cl.
CPC .......... *G06F 3/013* (2013.01); *G06F 3/04817* (2013.01); *G06F 3/04845* (2013.01); *G06F 3/1423* (2013.01); *B60K 2360/1438* (2024.01); *B60K 2360/167* (2024.01); *B60K 2360/186* (2024.01); *G06F 2203/04803* (2013.01)

(58) Field of Classification Search
CPC ........ G06F 2203/04803; B60K 35/235; B60K 35/22; B60K 2360/167; B60K 2360/1438; B60K 2360/186
See application file for complete search history.

(56) References Cited

FOREIGN PATENT DOCUMENTS

| | | |
|---|---|---|
| CN | 214751840 U | 11/2021 |
| CN | 114882579 A | 8/2022 |
| CN | 115598827 A | 1/2023 |

* cited by examiner

MULTI-SCREEN COCKPIT DISPLAY SYSTEM

CROSS-REFERENCE TO RELATED PATENT APPLICATION

This non-provisional application claims priority to and the benefit of, pursuant to 35 U.S.C. § 119(e), U.S. provisional patent application Ser. No. 63/467,416 filed May 18, 2023. This non-provisional application also claims priority to and the benefit of, pursuant to 35 U.S.C. § 119(a), patent application No. 112132884 filed in Taiwan on Aug. 30, 2023. The disclosure of each of the above applications is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present disclosure relates to a multi-screen display system, and particularly to a multi-screen cockpit display system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The display device in the automotive field has become increasingly prominent as the display technology matures. In recent years, in some high-end car models available on the market, traditional dashboards, rearview mirrors, or center consoles are gradually being replaced by flat or curved display devices. However, the in-vehicle display devices that serve different functions often require different hosts for driving, such that information transfer between different hosts is challenging, and wiring is more complex. This not only leads to inconvenience for drivers or passengers in operation, but also significantly increases the difficulty during maintenance or repair.

SUMMARY

One aspect of the present disclosure provides a multi-screen cockpit display system, which may provide the user with a more intuitive and convenient user interface as well as a better immersive experience.

The multi-screen cockpit display system according to one aspect of the present disclosure includes a first display device, at least two head-up display devices and a control unit. The first display device is disposed in front of a driver's seat in the cockpit, and is configured to display a first dynamic information. The at least two head-up display devices are disposed above the first display device, and are configured to display a second dynamic information on a see-through window of the cockpit. The control unit is electrically connected to the first display device and the at least two head-up display devices. The control unit is configured to provide the first dynamic information and the second dynamic information to the first display device and the at least two head-up display devices according to an operating state of the cockpit.

The multi-screen cockpit display system according to another aspect of the present disclosure includes a first display device, an eye tracking module and a control unit. The first display device is disposed in front of a driver's seat in the cockpit, and is configured to display a first dynamic information. The eye tracking module is disposed corresponding to the driver's seat and a passenger seat in the cockpit, and is configured to detect a visual direction of a driver on the driver's seat or a co-pilot on the passenger seat. The control unit is electrically connected to the first display device and the eye tracking module. The first display device is further configured to display a plurality of functional icons between the driver's seat and the passenger seat. When one of the driver and the co-pilot gazes on the functional icons, the control unit is configured to adjust a virtual display surface of the functional icons according to the binocular position obtained by the eye tracking module, such that a normal direction of the virtual display surface passes through the one of the driver and the co-pilot.

Based on the foregoing, in the multi-screen cockpit display system according to one embodiment of the present disclosure, the first display device disposed in front of the driver's seat and the at least two head-up display devices above are driven by the same control unit. Thus, the information transfer between the display devices is convenient, and the operation is intuitive. In addition, the at least two head-up display devices disposed to overlap with the see-through window may further provide the user with a better immersive experience. In the multi-screen cockpit display system according to another embodiment of the present disclosure, the eye tracking module is utilized to obtain the visual direction of the user, thereby dynamically adjusting the content display effect of the human-machine interactive interface, which helps enhance the interface experience of the user.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
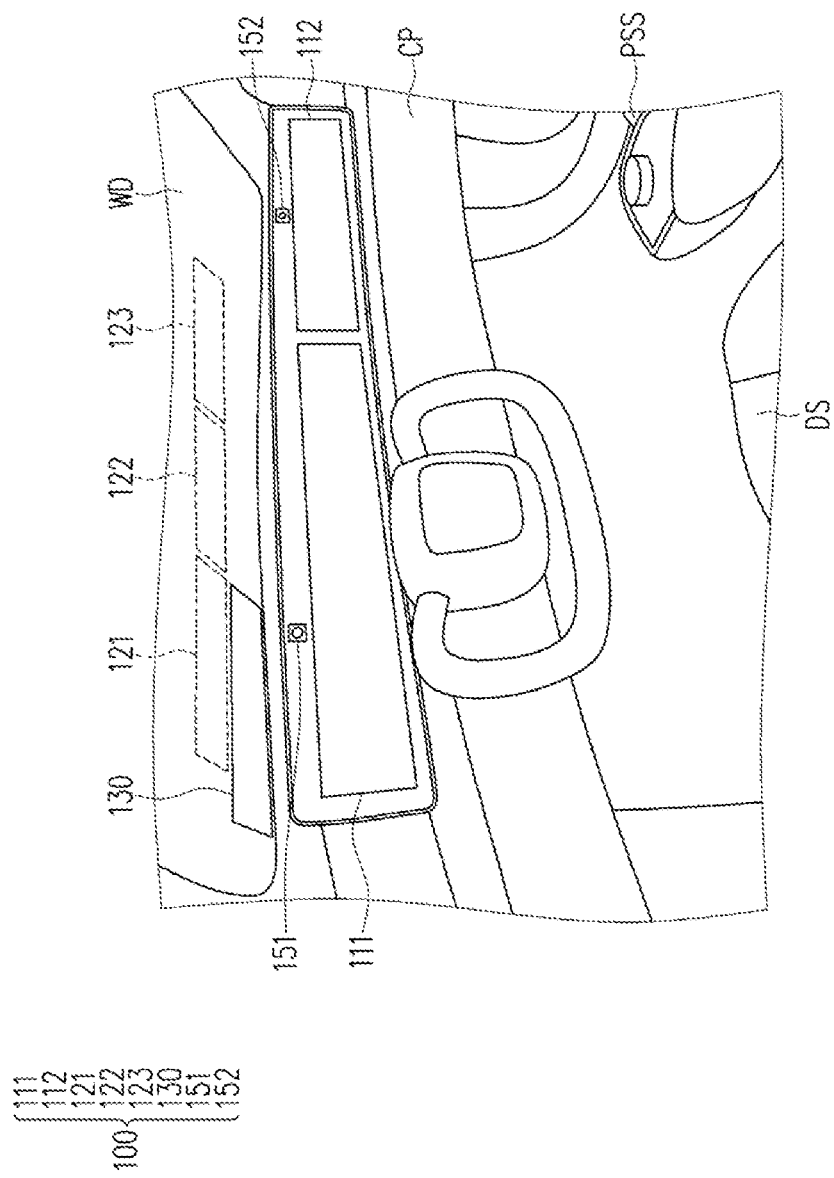
FIG. 1 is a perspective schematic view of a multi-screen cockpit display system according to one embodiment of the present disclosure.

The terms "about", "approximately", "essentially" or "substantially" as used herein shall cover the values described, and cover an average value of an acceptable deviation range of the specific values ascertained by one of ordinary skill in the art, where the deviation range may be determined by the measurement described and specific quantities of errors related to the measurement (that is, the limitations of the measuring system). For example, the term "about" represents within one or more standard deviations of a given value of range, such as within ±30 percent, within ±20 percent, within ±15 percent, within ±10 percent or within ±5 percent. Moreover, the terms "about", "approximately", "essentially" or "substantially" as used herein may selectively refer to a more acceptable deviation range or the standard deviation based on the measuring characteristics, the cutting characteristic or other characteristics, without applying one standard deviation to all characteristics.

In the accompanying drawings, for clarity purposes, the thickness of a layer, a film, a panel, a region, etc. may be enlarged. It should be understood that when one component such as a layer, a film, a region or a substrate is referred to as being disposed "on" the other component or "connected to" the other component, the component may be directly disposed on the other component or connected to the other component, or an intermediate component may also exist between the two components. In contrast, when one component is referred to as being "directly disposed on the other component" or "directly connected to" the other component, no intermediate component exists therebetween. As used herein, a "connection" may be a physical and/or electrical connection. In addition, when two components are "electrically connected", other components may exist between the two components.

Furthermore, relative terms, such as "lower" or "bottom", "upper" or "top", and "left" and "right", may be used herein to describe the relationship between one component and the other component as illustrated in the drawings. It should be understood that the relative terms are intended to encompass different orientations of the device in addition to the orientation in the drawings. For example, if the device in one of the drawings is turned over, components described as being on the "lower" side of other components would then be oriented on "upper" sides of the other components. The exemplary term "lower" can therefore encompasses both an orientation of "lower" and "upper," depending on the particular orientation of the accompanying drawings. Similarly, if the device in one of the drawings is turned over, components described as "below" or "beneath" other components would then be oriented "above" the other components. The exemplary terms "below" or "beneath" can therefore encompass both an orientation of being above and below.

Herein, exemplary embodiments are described with reference to sectional views of schematic diagrams of ideal embodiments. Therefore, changes of shapes in the drawings that are used as results of manufacturing technology, tolerances and/or the like may be expected. Therefore, herein, the embodiments should not be explained to be limited to particular shapes of regions herein, but instead, comprise shape deviations caused by manufacturing and the like. For example, regions that are shown or described to be flat may usually have rough and/or nonlinear features. In addition, a shown acute angle may be rounded. Therefore, regions in the drawings are essentially schematic, and shapes of the regions are not intended to show precise shapes of the regions and are not intended to limit the scope of the claims.

The present disclosure will now be described hereinafter in details with reference to the accompanying drawings, in which exemplary embodiments of the disclosure are shown. Whenever possible, identical reference numerals refer to identical or like elements in the drawings and descriptions.

Figure 2:
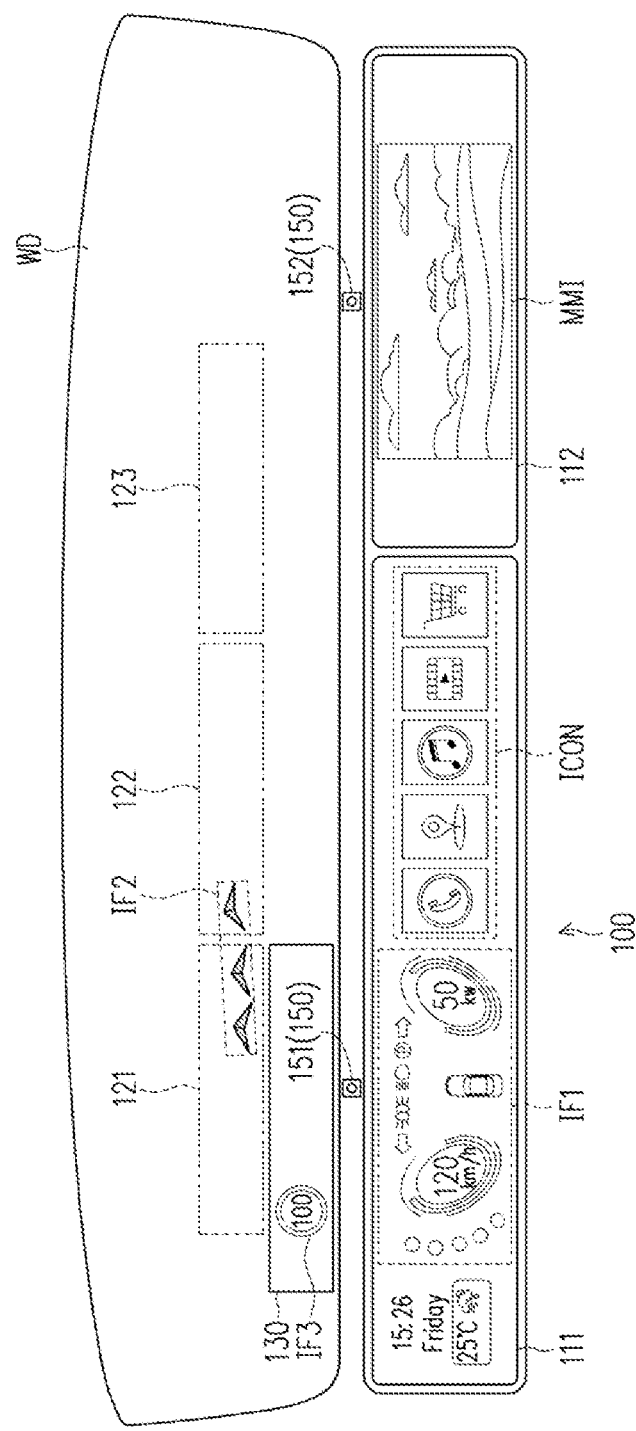
FIG. 2 is a front schematic view of the multi-screen cockpit display system of FIG. 1.
Figure 3:
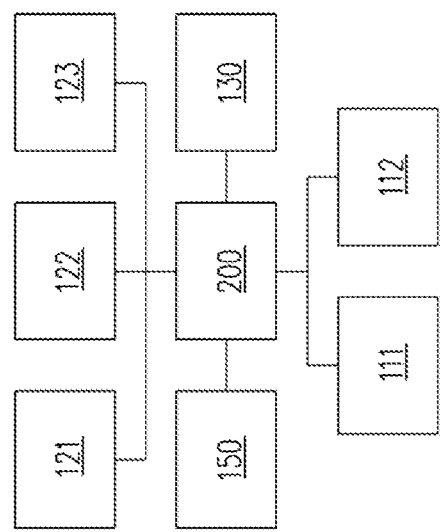
FIG. 3 is a block diagram of the multi-screen cockpit display system of FIG. 2.

FIG. 1 is a perspective schematic view of a multi-screen cockpit display system according to one embodiment of the present disclosure. FIG. 2 is a front schematic view of the multi-screen cockpit display system of FIG. 1. FIG. 3 is a block diagram of the multi-screen cockpit display system of FIG. 2.

Referring to FIG. 1 to FIG. 3, the multi-screen cockpit display system 100 suitable for being installed in a cockpit CP includes a first display device 111, a second display device 112, a self-luminous display device 130 and a plurality of head-up display devices. In the present embodiment, the cockpit CP may be, for example, a car cockpit, without being limited thereto. In other embodiments, the cockpit may be a simulator cockpit or a computer cockpit.

Figure 6:
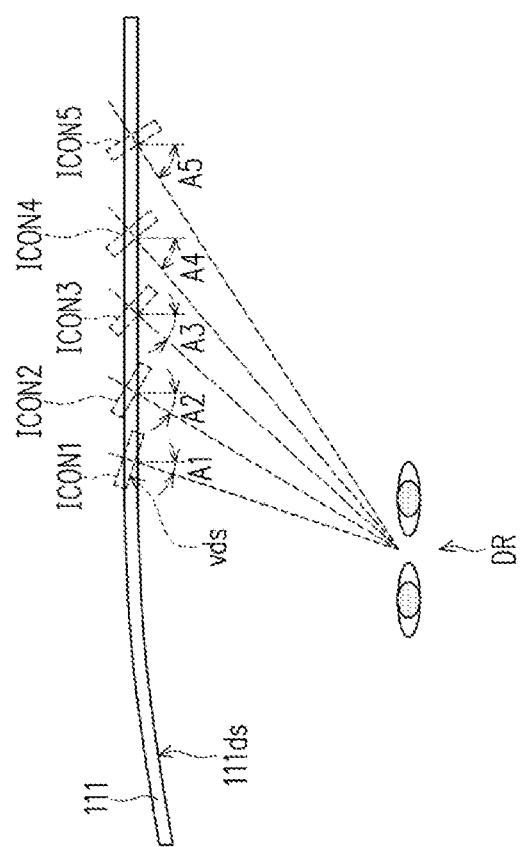
FIG. 6 is a top schematic view of the first display device of FIG. 5A.

The first display device 111 is disposed in front of a driver's seat DS in the cockpit CP, and is suitable for display a first dynamic information IF1. In the present embodiment, the first display device 111 may function as a car dashboard, and the first dynamic information IF1 may include, for example, vehicle speed, power consumption, engine speed and dashboard lights, without being limited thereto. The second display device 112 is disposed in front of a passenger seat PSS in the cockpit CP, and is suitable for displaying a multimedia image MMI. It should be noted that, in the present embodiment, the first display device 111 is, for example, a curved display device (as shown in FIG. 6), without being limited thereto.

The head-up display devices are disposed above the first display device 111, and are suitable for displaying a second dynamic information IF2 on a see-through window WD of the cockpit CP. In the present embodiment, the quantity of the head-up display devices of the multi-screen cockpit display system 100 may be three, including a first head-up display device 121, a second head-up display device 122 and a third head-up display device 123. For example, the three head-up display devices may display the second dynamic information IF2 in a stitching manner, or may respectively display the second dynamic information independently. The second dynamic information includes, for example, navigation markers, warning signs and distance markers, without being limited thereto.

The self-luminous display device 130 is disposed to overlap with the see-through window WD of the cockpit CP, and is suitable for display a third dynamic information IF3. The third dynamic information IF3 includes, for example, driving speed limits, vehicle gear positions and vehicle speed, without limited thereto. In the present embodiment, the self-luminous display device 130 may be located between the three head-up display devices and the first display device 111. It should be noted that the self-luminous display device 130 may be further suitable for displaying at least part of the first dynamic information.

In the present embodiment, the display sizes of the first display device 111, the second display device 112, the head-up display devices and the self-luminous display device 130 may respectively be, for example, 30.4 inches, 21.6 inches, 10.3 inches and 15.5 inches, without being limited thereto.

The multi-screen cockpit display system 100 further includes a control unit 200, which is electrically connected to the first display device 111, the second display device 112, the first head-up display device 121, the second head-up display device 122, the third head-up display device 123 and the self-luminous display device 130. The control unit 200 is suitable for providing the first dynamic information, the second dynamic information and the third dynamic information to the first display device 111, the head-up display devices and the self-luminous display device 130 according to the operating state of the cockpit CP.

The control unit 200 herein mentioned may be a cockpit domain controller (CDC), which has high-performance computing capabilities. Since the display devices are all driven by the same control unit 200, the information transfer between the display devices is convenient, and the operation is intuitive. For example, in the present embodiment, the control unit 200 is suitable for executing various algorithms to implement the functions of actively adjustment. To execute the algorithms, the multi-screen cockpit display system 100 further includes an eye tracking module 150 disposed corresponding to the driver's seat DS and the passenger seat PSS, and the eye tracking module 150 is electrically connected to the control unit 200.

In the present embodiment, the eye tracking module 150 is suitable for detecting the binocular position or the visual direction of the driver DR on the driver's seat DS or the co-pilot (that is, the passenger) PS on the passenger seat PSS. For example, the eye tracking module 150 may include a first camera component 151 disposed corresponding to the driver's seat DS and a second camera component 152 disposed corresponding to the passenger seat PSS. To perform the detection in the dim cockpit CP, the eye tracking module 150 may further optionally include an infrared (IR) light source.

The control unit 200 may optionally execute a specific algorithm according to the binocular position or the visual direction of the driver DR or the co-pilot PS obtained by the eye tracking module 150 in order to actively adjust the display contents or the operating state of the display devices. Exemplary descriptions of the operation of the multi-screen cockpit display system 100 in various scenarios are hereinafter demonstrated as follows.

Figure 4A:
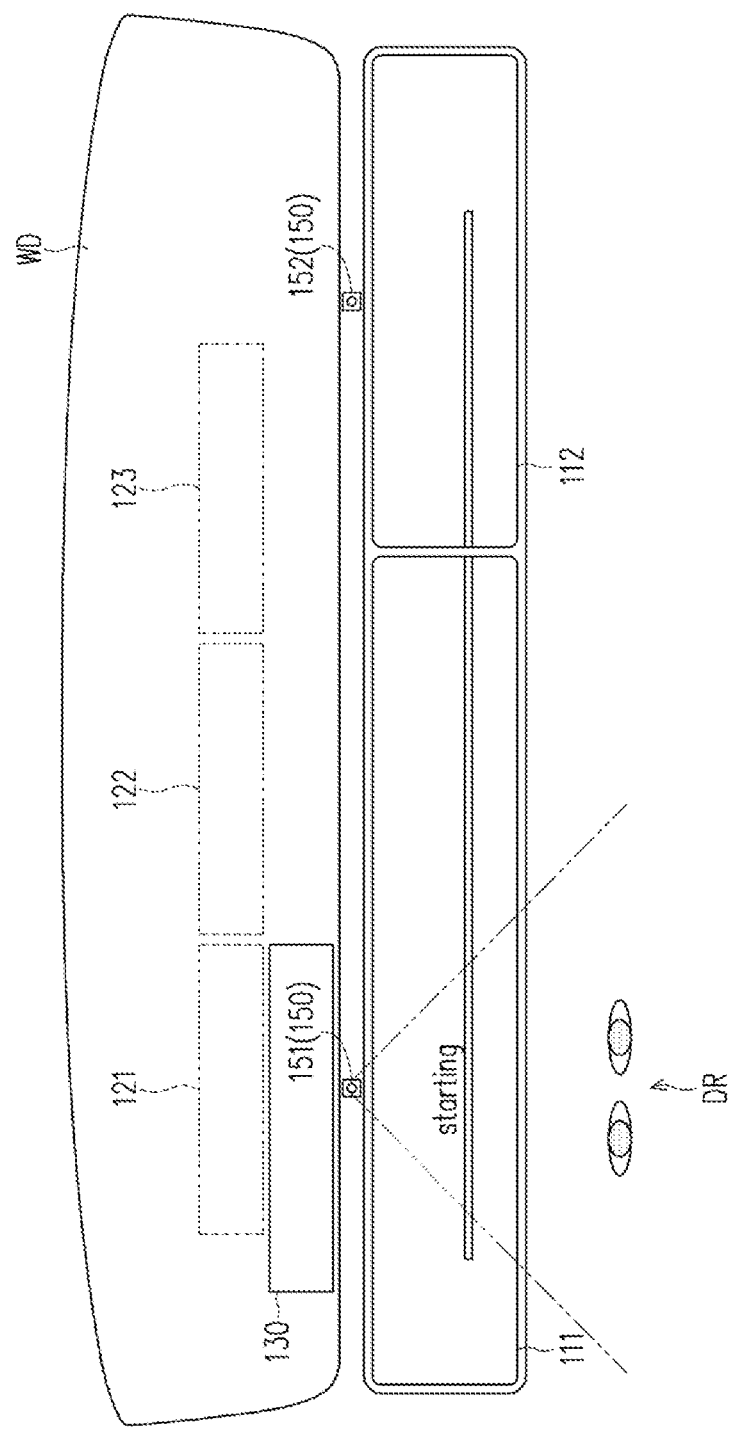
FIG. 4A to FIG. 4C are flowcharts of the startup of the multi-screen cockpit display system of FIG. 1.
Figure 4B:
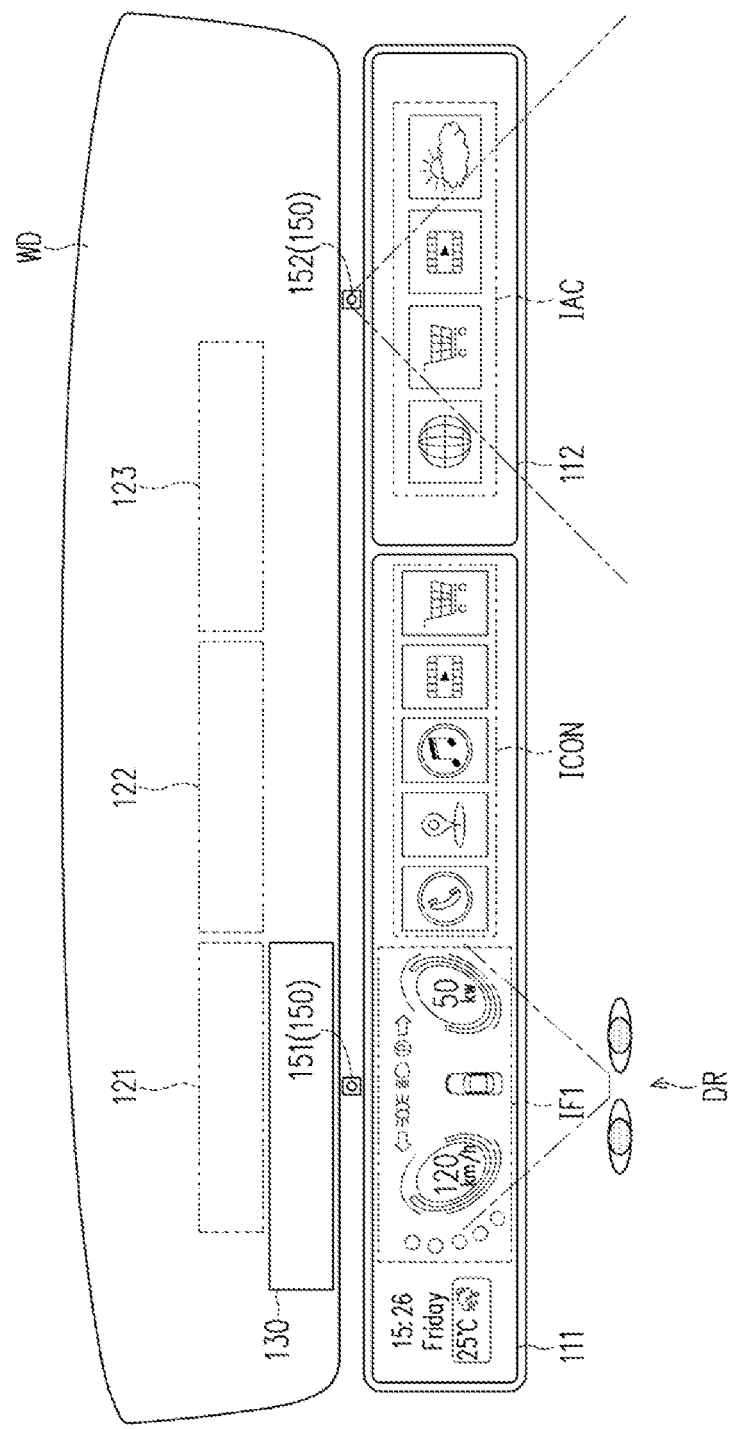
Figure 4C:
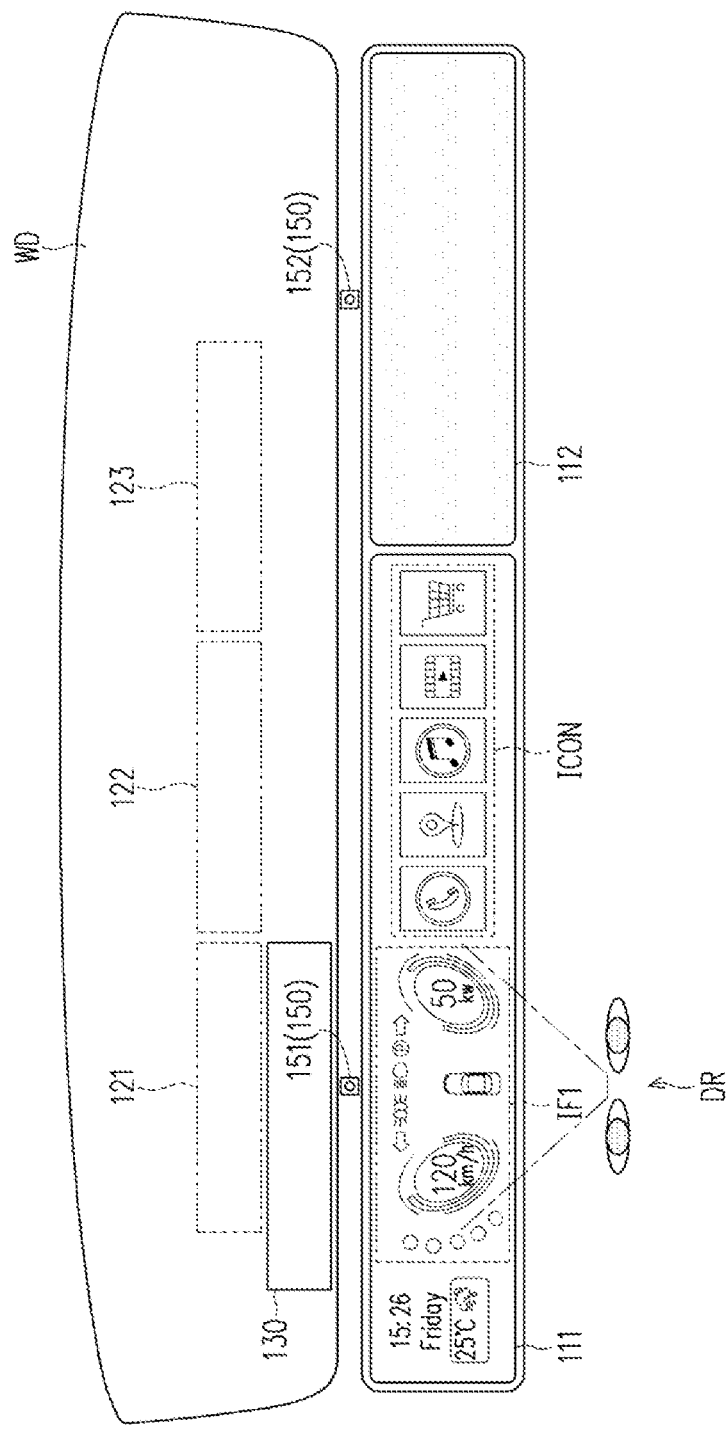
Figure 5A:
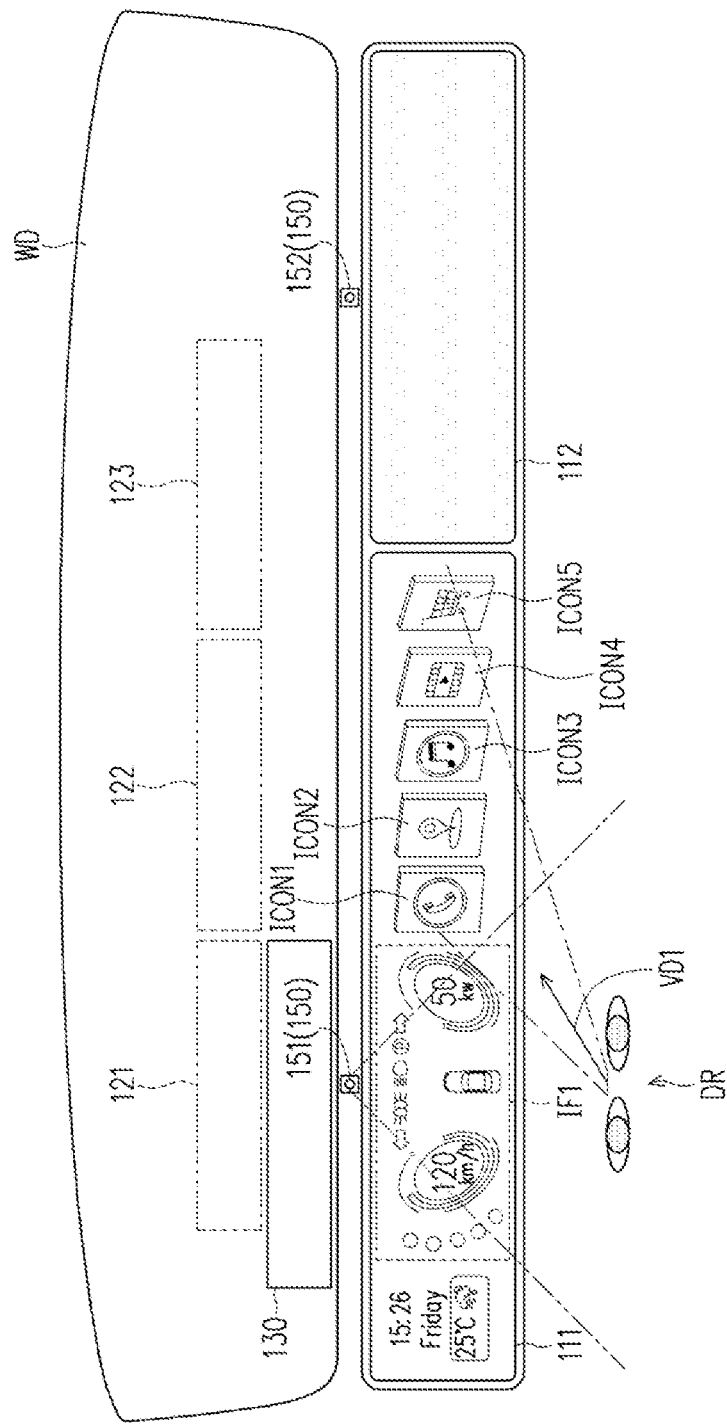
FIG. 5A to FIG. 5C are flowcharts of the multi-screen cockpit display system of FIG. 1 in a first scenario.
Figure 5B:
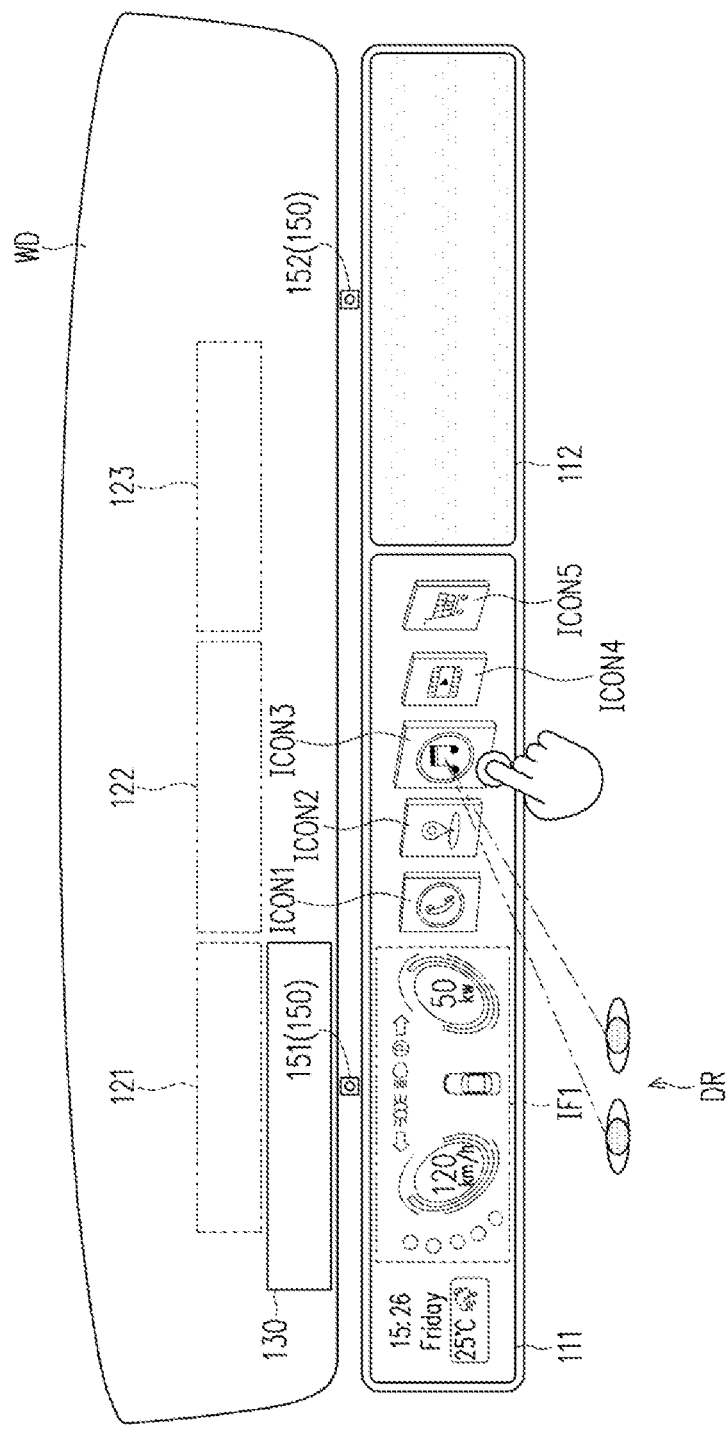
Figure 5C:
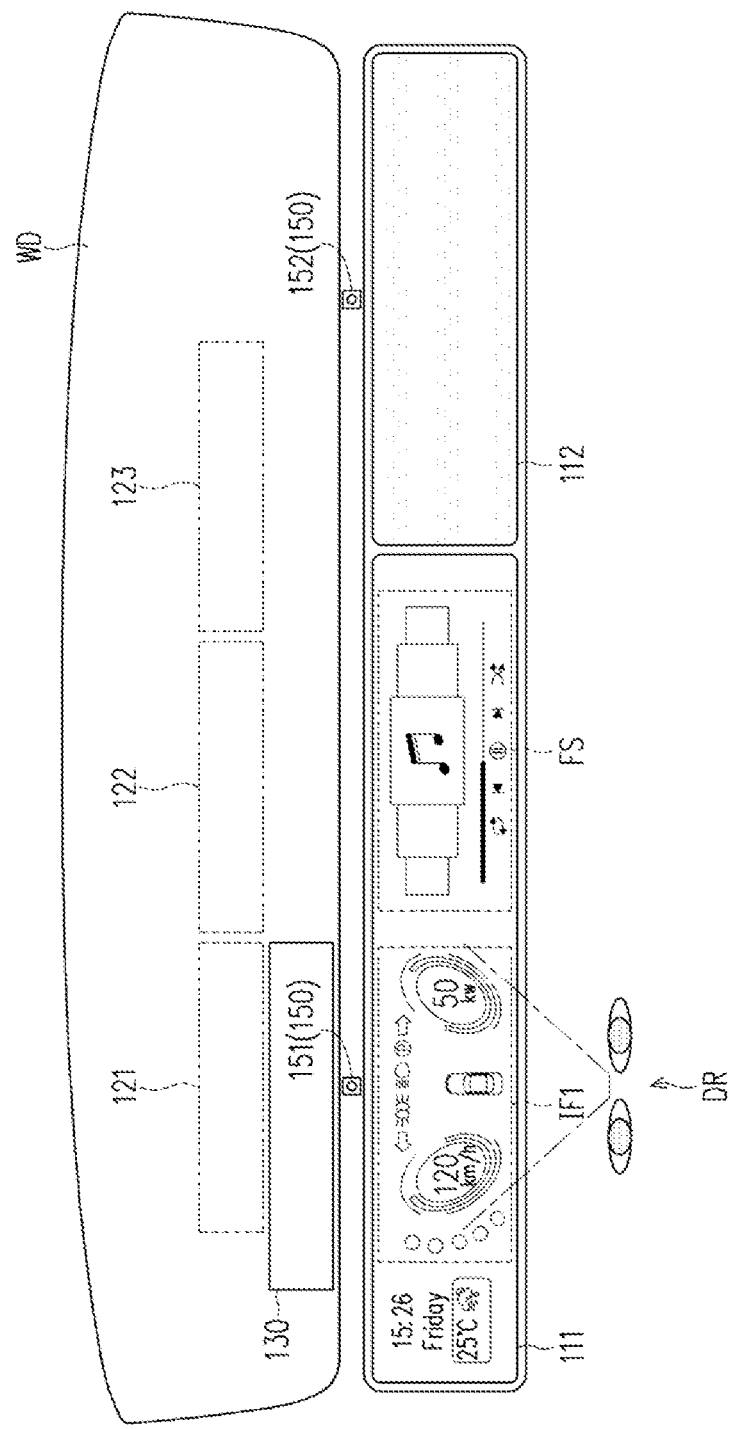

FIG. 4A to FIG. 4C are flowcharts of the startup of the multi-screen cockpit display system of FIG. 1. FIG. 5A to FIG. 5C are flowcharts of the multi-screen cockpit display system of FIG. 1 in a first scenario. FIG. 6 is a top schematic view of the first display device of FIG. 5A.

Referring to FIG. 4A, when the driver DR enters the cockpit CP as shown in FIG. 1 and sits on the driver's seat DS, the eye tracking module 150 may detect the face of the driver DR by the first camera component 151, and triggers the control unit 200 to activate the startup screen of the display devices. For example, after the startup is completed, the first display device 111 and the second display device 112 may remain on the home page screen and maintain it for a period of time (such as 60 seconds). The content on the home page may include the first dynamic information IF1 displayed on the first display device 111, a plurality of functional icons ICON, time, date, weather status and the interactive content IAC displayed on the second display device 112, without being limited thereto.

Referring to FIG. 4B, after the screens of the first display device 111 and the second display device 112 remain on the home page for a period of time, the control unit 200 may detect whether a passenger is on the passenger seat PSS of FIG. 1 by the second camera component 152 of the eye tracking module 150. If so, the screen of the second display device 112 remains on the home page, and if not, the second display device 112 is turned off (as shown in FIG. 4C).

Further, the control unit 200 of FIG. 3 may further detect the visual direction of the driver DR by the first camera component 151 of the eye tracking module 150. When the visual direction VD1 of the driver DR is toward the functional icons ICON in FIG. 4C, the control unit 200 may adjust the functional icons ICON, such that a virtual display surface vds of each functional icon ICON faces the driver DR and maintains a period of time (such as 10 seconds), as shown in FIG. 5A and FIG. 6. The term "facing the driver DR" mentioned herein refers to, for example, a normal direction of the virtual display surface vds of the functional icon ICON passing through the driver DR.

In detail, the quantity of the functional icons ICON may be, for example, five, and the functional icons ICON are arranged based on the respective distances of the functional icons ICON and the driver DR sequentially in an ascending order as the functional icon ICON1, the functional icon ICON2, the functional icon ICON3, the functional icon ICON4 and the functional icon ICON5. When the functional icons face the driver DR, an included angle between the normal direction of the virtual display surface vsd of each functional icon and a normal direction of a display surface 111ds of the first display device 111 increases by moving away from the driver DR. In other words, when the driver DR looks at the functional icons, the included angles between the virtual display surfaces vsd of the functional icons and the display surface 111ds of the first display device 111 are arranged sequentially in an ascending order as the included angle A1 of the functional icon ICON1, the included angle A2 of the functional icon ICON2, the included angle A3 of the functional icon ICON3, the included angle A4 of the functional icon ICON4 and the included angle A5 of the functional icon ICON5.

Referring to FIG. 5B, when the driver DR gazes on one of the functional icons (such as the functional icon ICON3), the control unit 200 of FIG. 3 may enlarge a size of the functional icon being gazed, and reduce sizes of others of the functional icons not being gazed. At this time, if the driver DR touches the functional icon being gazed with his/her hand, it triggers the control unit 200 to open the functional page FS of the functional icon (as shown in FIG. 5C).

However, the present disclosure is not limited thereto. In other embodiments, the driver DR may also node or consciously blink instead of the finger touching action. For example, the nodding action mentioned herein may be confirm by the eye tracking module 150 determining the movement of the face or the binocular position of the driver DR in space.

It should be particularly noted that, if the driver DR does not select any functional icon and turns the visual direction elsewhere, the functional icons return to the display state as shown in FIG. 4C, that is, the virtual display surface vds of each functional icon in FIG. 6 is arranged to be parallel to the display surface 111ds of the first display device 111.

Figure 7A:
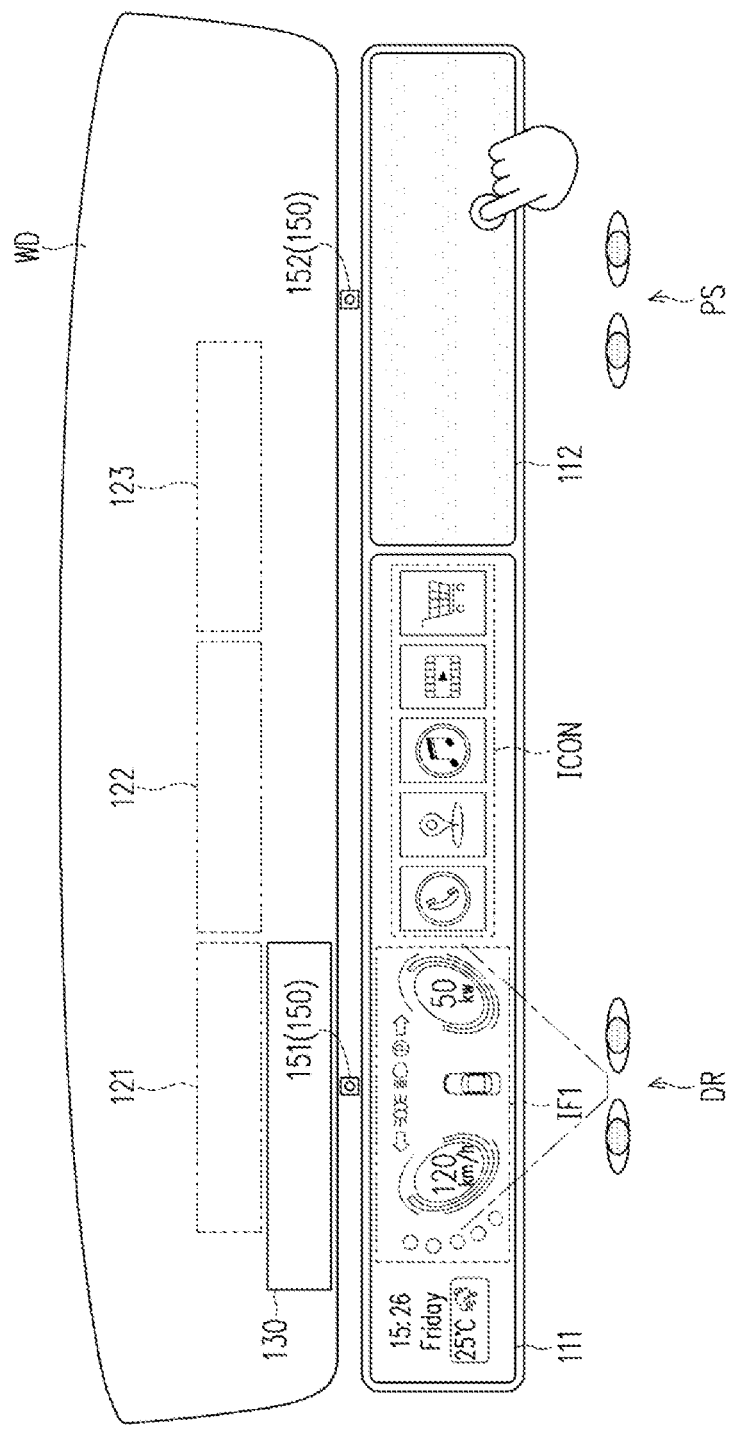
FIG. 7A to FIG. 7E are flowcharts of the multi-screen cockpit display system of FIG. 1 in a second scenario.
Figure 7B:
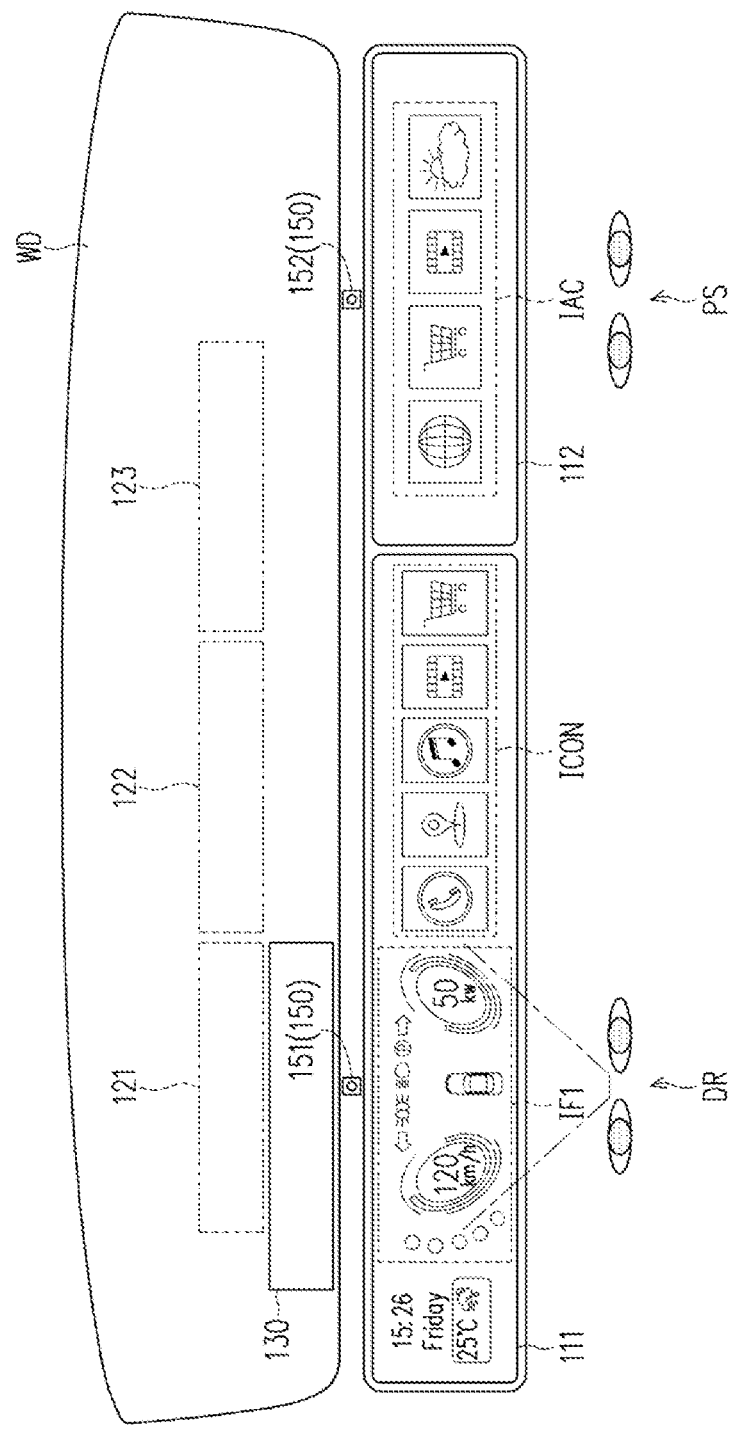

FIG. 7A to FIG. 7E are flowcharts of the multi-screen cockpit display system of FIG. 1 in a second scenario. When the passenger seat PSS of FIG. 1 has a co-pilot PS sitting thereon, the second display device 112 which was turned off may be awakened by the finger touch of the co-pilot PS, as shown in FIG. 7A and FIG. 7B.

Figure 7C:
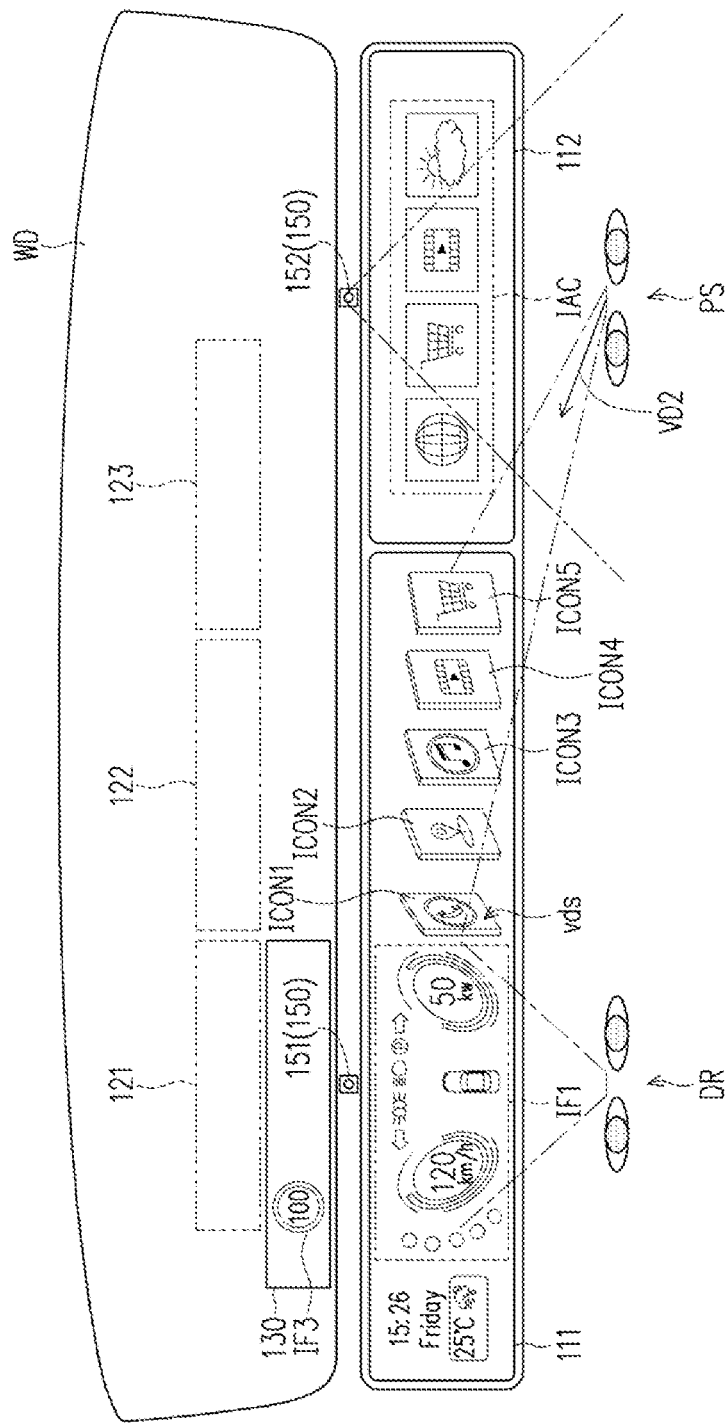

The control unit 200 of FIG. 3 may further detect the visual direction of the co-pilot PS by the second camera component 152 of the eye tracking module 150. When the visual direction VD2 of the co-pilot PS is toward the functional icons ICON in FIG. 7B, the control unit 200 may adjust the functional icons ICON, such that a virtual display surface vds of each functional icon ICON faces the co-pilot PS and maintains a period of time (such as 10 seconds), as shown in FIG. 7C. The term "facing the co-pilot PS" mentioned herein refers to, for example, a normal direction of the virtual display surface vds of the functional icon ICON passing through the co-pilot PS.

Different from the deviation angle distribution of the functional icons ICON1~ICON5 in FIG. 6, when the respective virtual display surfaces vds of the functional icons ICON1~ICON5 face the co-pilot PS, an included angle between the normal direction of the virtual display surface vsd of each of the functional icons ICON1~ICON5 and the normal direction of a display surface 111ds of the first display device 111 increases by moving away from the co-pilot PS. That is, the deviation angle of the functional ICON1 which is the farthest away from the co-pilot PS is the greatest, and the deviation angle of the functional ICON5 which is the closest to the co-pilot PS is the least, and so on.

It should be noted that, when the driver DR and the co-pilot PS simultaneously gaze the functional icons ICON1~ICON5, the control unit 200 may prioritize by adjusting the virtual display surfaces vds of the functional icons ICON1~ICON5 to face the driver DR.

Figure 7D:
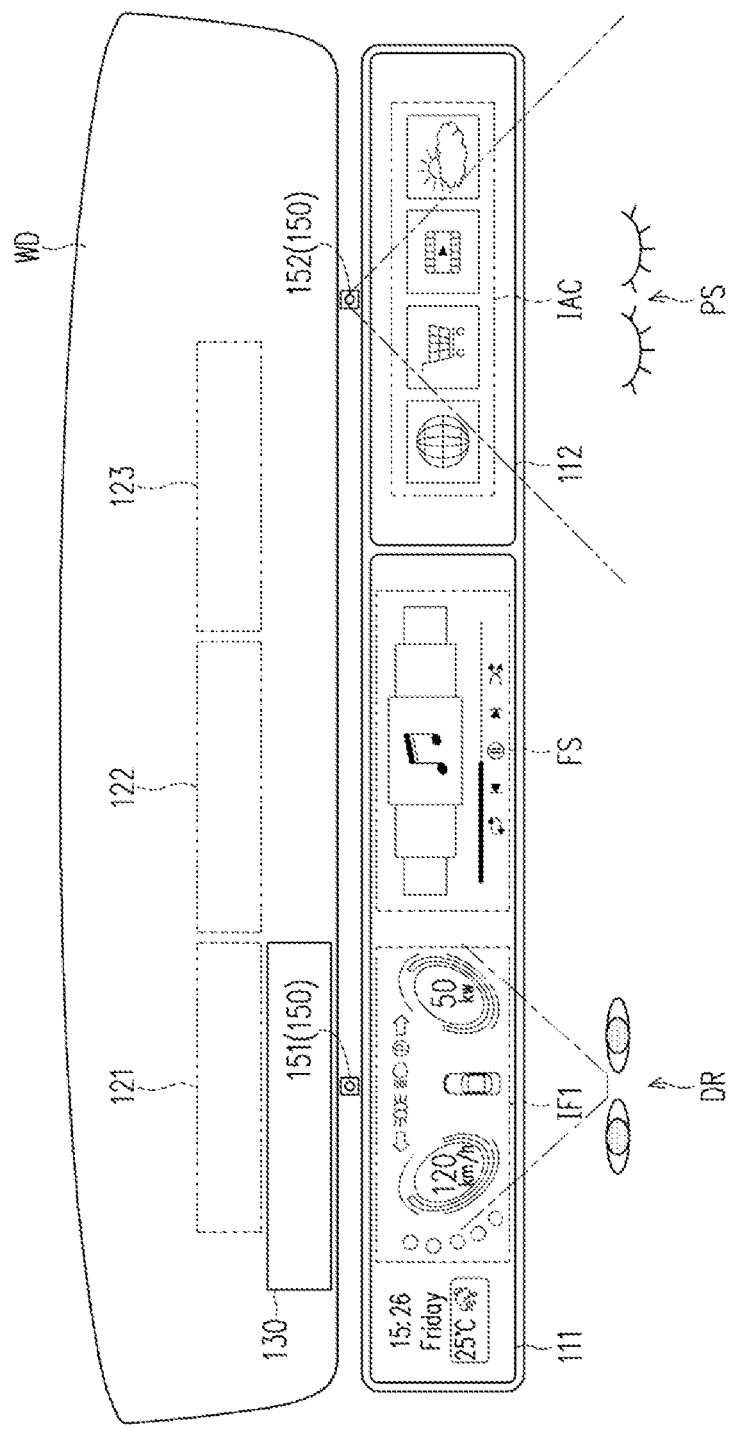
Figure 7E:
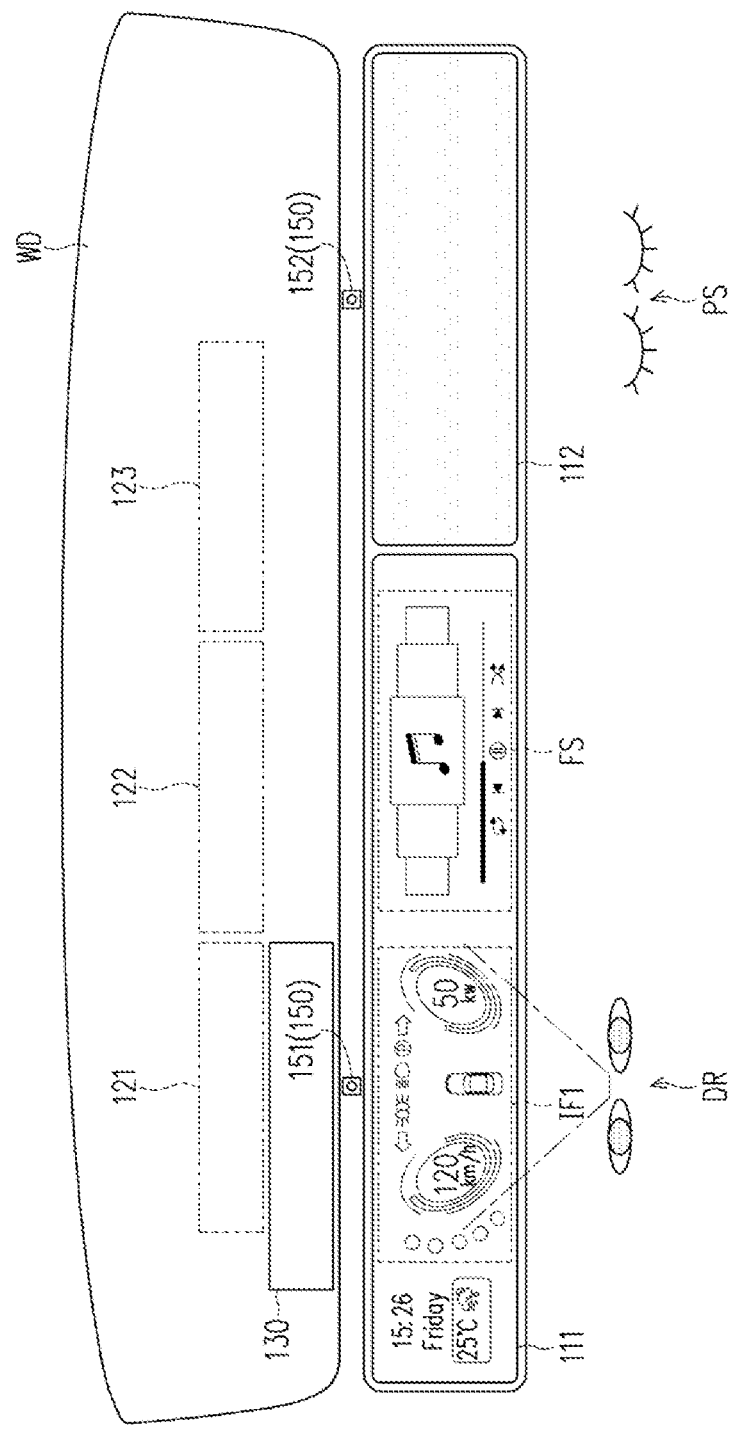

Referring to FIG. 3, FIG. 7D and FIG. 7E, if the control unit 200 detects the eyes of the co-pilot PS to close over a determined time (such as 5 second) by the second camera component 152 of the eye tracking module 150, it turns off the second display device 112.

Figure 8A:
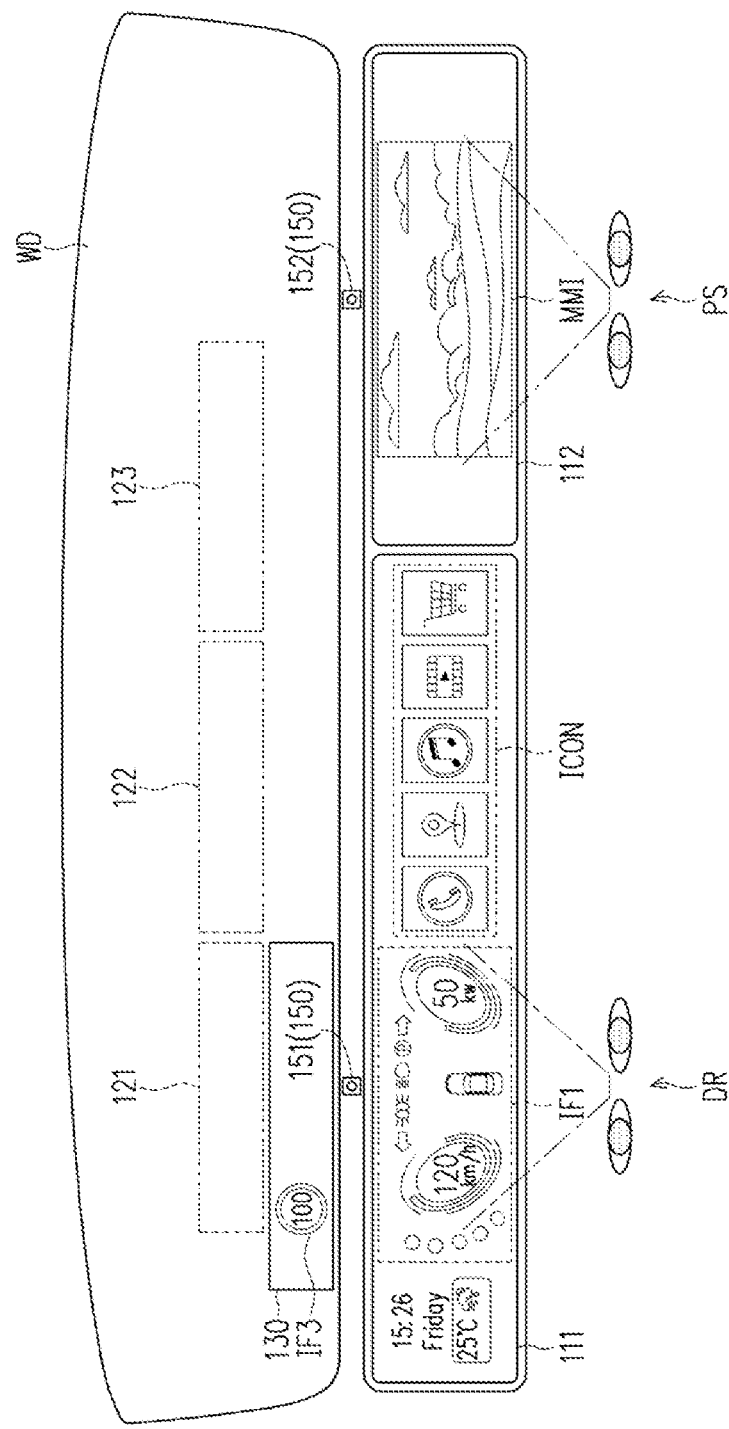
FIG. 8A and FIG. 8B are flowcharts of the multi-screen cockpit display system of FIG. 1 in a third scenario.
Figure 8B:
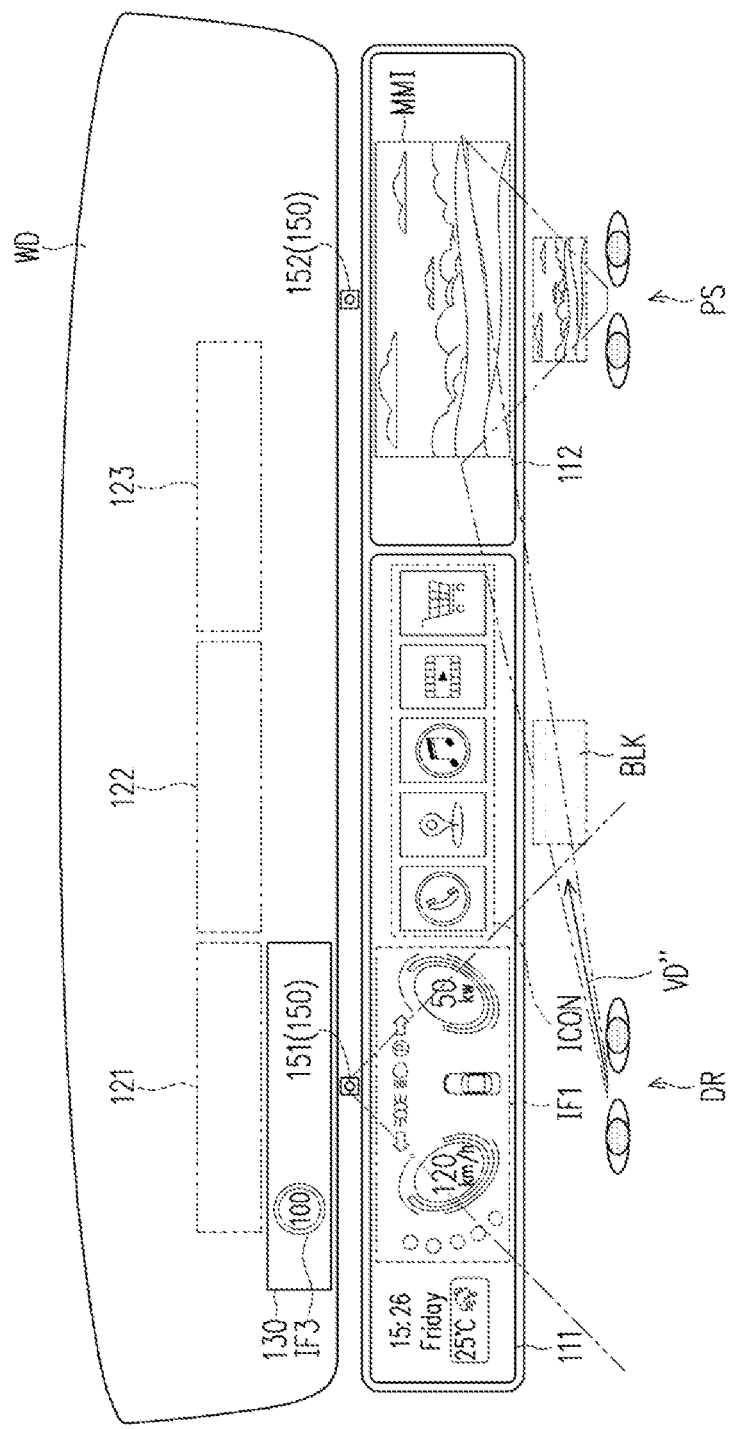

FIG. 8A and FIG. 8B are flowcharts of the multi-screen cockpit display system of FIG. 1 in a third scenario. For example, in the present embodiment, the second display device 112 may switch the operation between a privacy mode and a sharing mode. The second display device 112 mentioned herein, which has the privacy function and is electrically controlled to switch, may be implemented by any privacy technology applicable to the display device that is well-known to one of ordinary skill in the art of the privacy display technology, and is thus not hereinafter elaborated.

As shown in FIG. 8A, in the driving process of the vehicle, the co-pilot PS may view the multimedia image MMI through the second display device 112. Referring to FIG. 3 and FIG. 8B, if the control unit 200 detects the visual direction VD" of the driver DR to pass or be toward the second display device 112 by the first camera component 151 of the eye tracking module 150, the control unit 200 may turn on the privacy mode of the second display device 112, such that the driver DR cannot see the multimedia image MMI displayed on the second display device 112. That is, while the co-pilot PS may still view the multimedia image MMI on the second display device 112, the view seen by the driver DR on the second display device 112 is a black screen BLK, thus preventing the driver DR from being distracted and ensuring the driving safety.

Figure 9A:
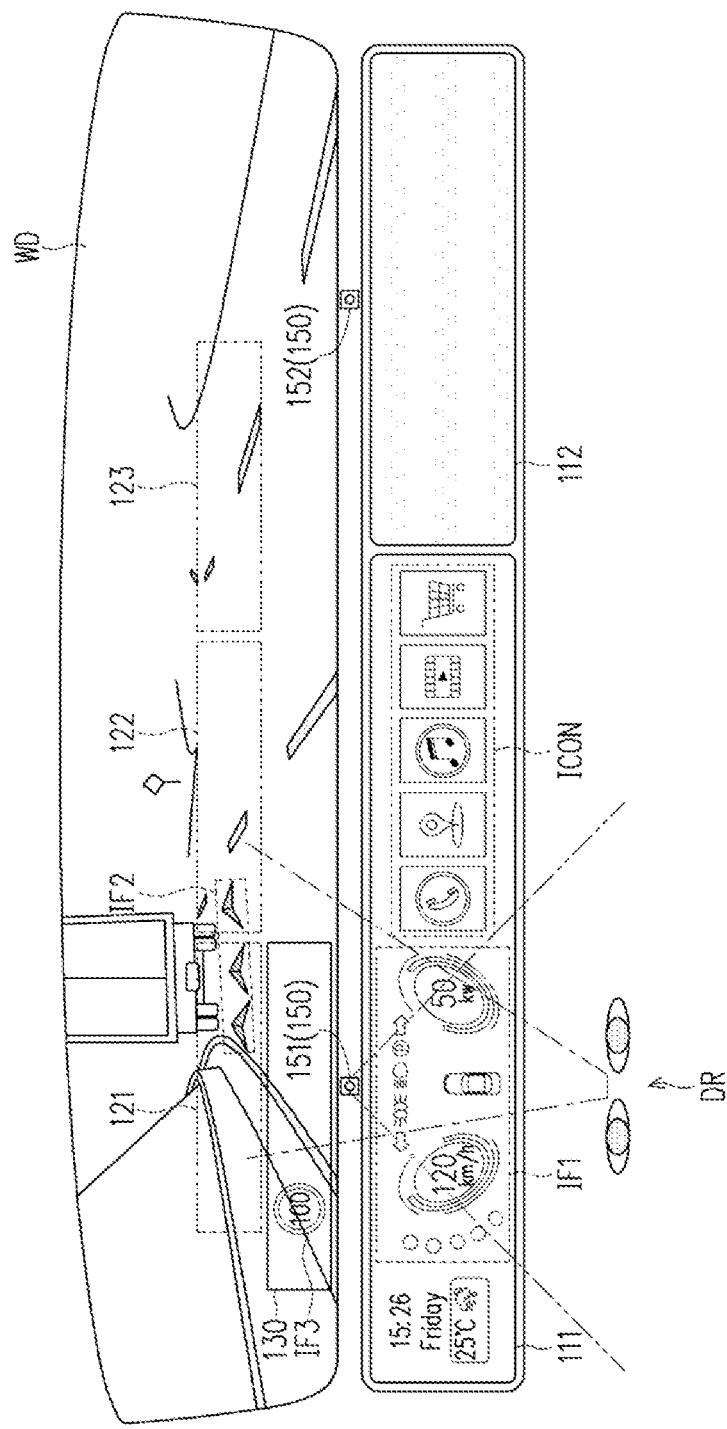
FIG. 9A and FIG. 9B are flowcharts of the multi-screen cockpit display system of FIG. 1 in a fourth scenario.
Figure 9B:
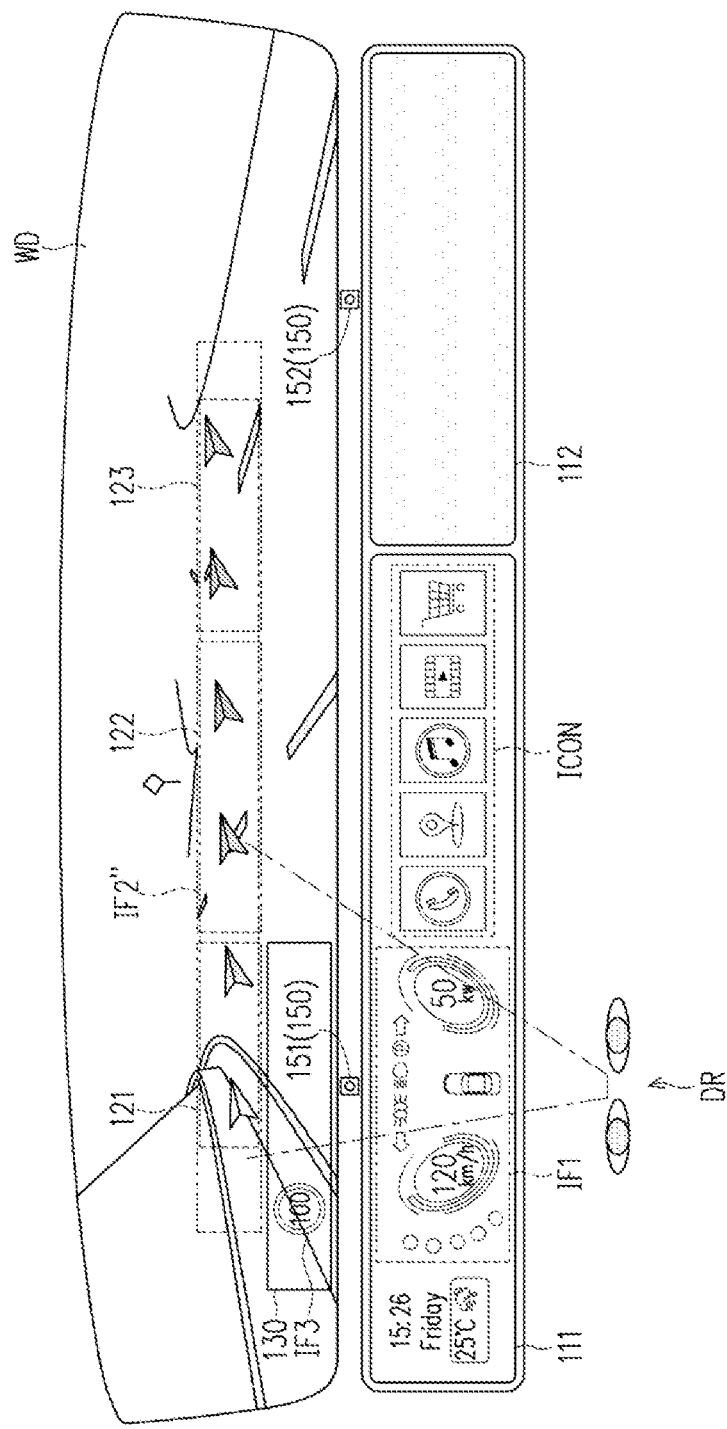
Figure 10:
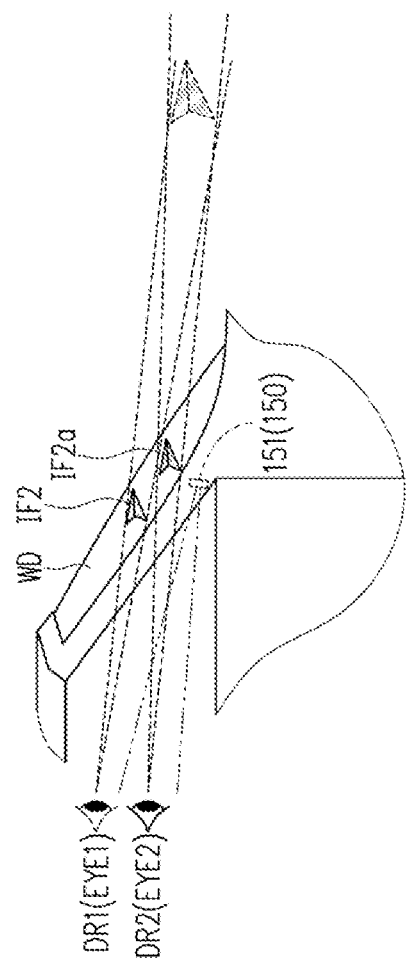
FIG. 10 is a side schematic view of the multi-screen cockpit display system of FIG. 1 in the fourth scenario.

FIG. 9A and FIG. 9B are flowcharts of the multi-screen cockpit display system of FIG. 1 in a fourth scenario. FIG. 10 is a side schematic view of the multi-screen cockpit display system of FIG. 1 in the fourth scenario. Referring to FIG. 3 and FIG. 9A, when the vehicle is driving on the road, the first head-up display device 121, the second head-up display device 122 and the third head-up display device 123 may be used to display navigation information (that is, the second dynamic information IF2) to guide the driver DR.

For example, the navigation system may display the guiding icons, such as the forward arrow in FIG. 9A, at locations that need to change direction on the route according to the destination set by the driver DR. To allow the guiding icons to be appropriately blended with the real scene, the control unit 200 may detect the eye height and the horizontal position (that is, the binocular position) of the driver DR by the first camera component 151 of the eye tracking module 150, and adjust the display position of the guiding icons (that is, the second dynamic information) on the head-up display devices according to the binocular position. When the vehicle needs to change its direction while driving, the navigation system may display the guiding icons (that is, the second dynamic information IF2") through the three head-up display devices 121~123 in a stitching manner as a reminder of the upcoming change in direction, as shown in FIG. 9B.

From another perspective, the adjusting mechanism may apply to drivers of different heights. Referring to FIG. 3 and FIG. 10, for example, when the vehicle is operated by a driver DR who is taller, the control unit 200 may display the second dynamic information IF2 on the see-through window WD at a first position that overlaps with the road surface according to the height of the eyes EYE thereof. When the vehicle is instead operated by a driver DR2 who is shorter, the control unit 200 may display the second dynamic information IF2a on the see-through window WD at a second position that overlaps with the road surface according to the height of the eyes EYE2 thereof. Since the driver DR2 is shorter, the second position of the second dynamic information IF2a being displayed on the see-through window WD is lower than the first position of the second dynamic information IF2 being displayed on the see-through window WD.

Figure 11A:
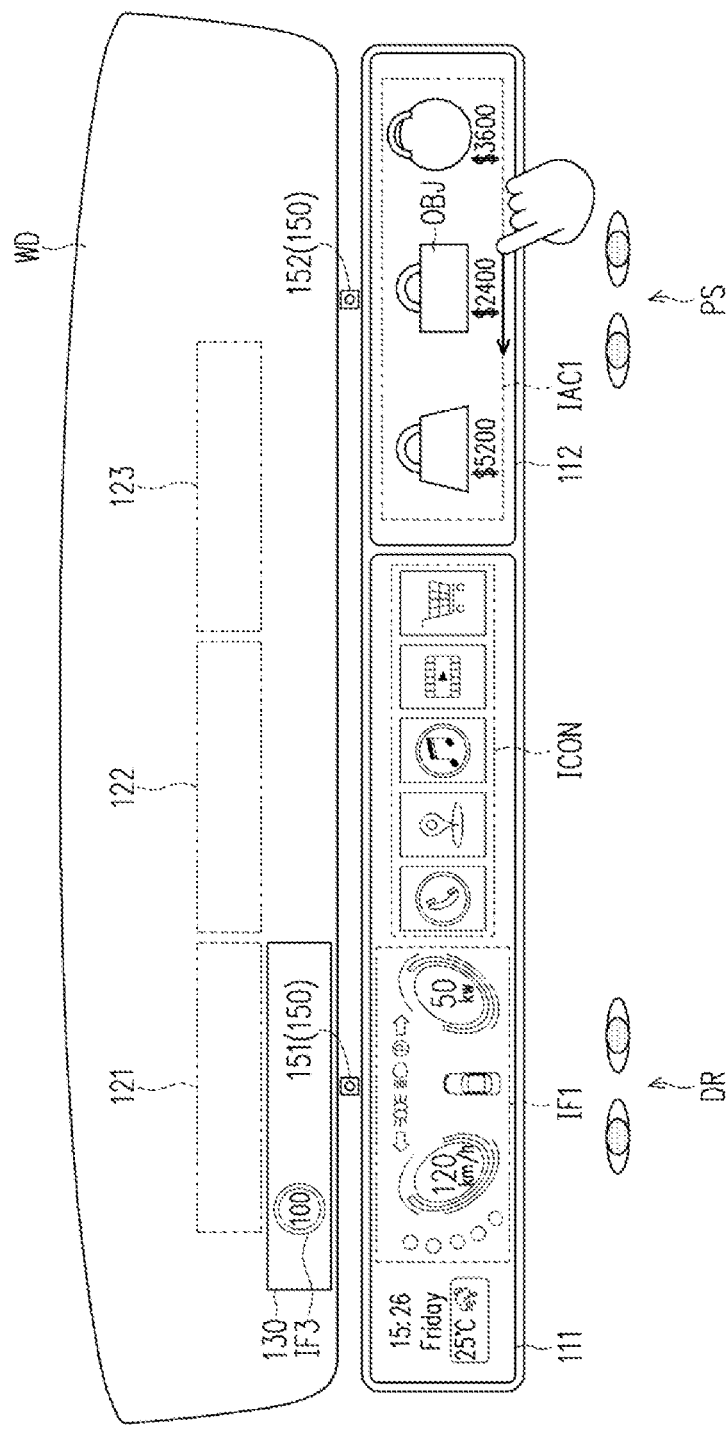
FIG. 11A to FIG. 11C are flowcharts of the multi-screen cockpit display system of FIG. 1 in a fifth scenario.
Figure 11B:
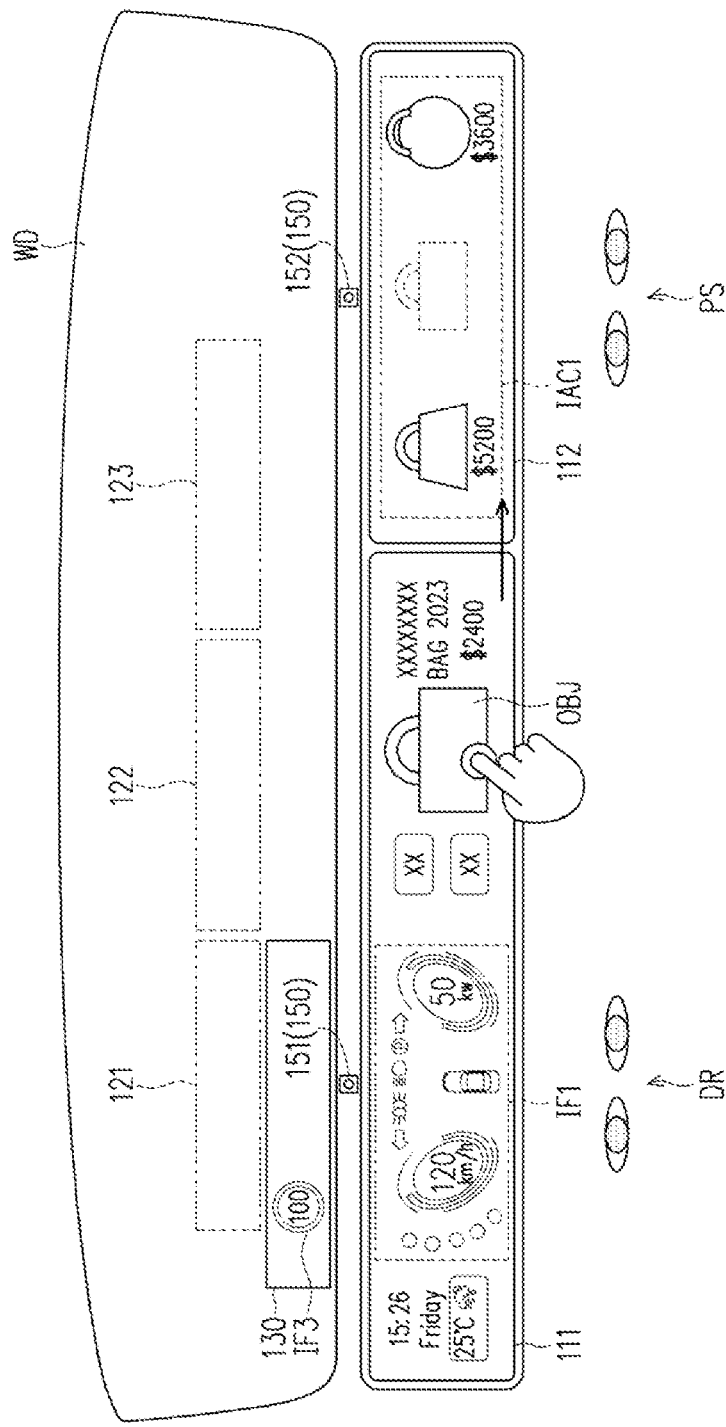
Figure 11C:
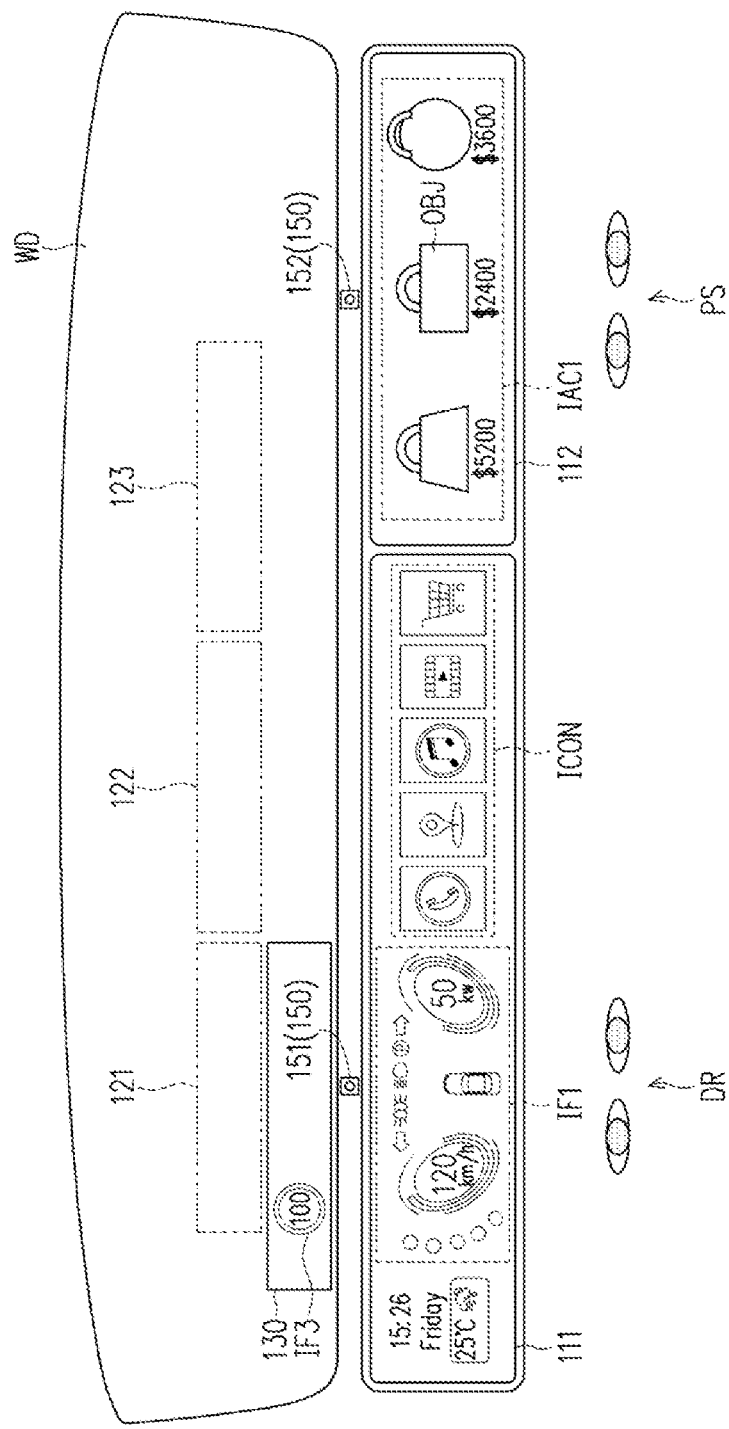

FIG. 11A to FIG. 11C are flowcharts of the multi-screen cockpit display system of FIG. 1 in a fifth scenario. Referring to FIG. 3 and FIG. 11A, the co-pilot PS may utilize the second display device 112 to browse the interactive content IAC1 (such as a shopping web page). In particular, any object OBJ in the interactive content IAC1 may be transferred from the second display device 112 to be displayed on the first display device 111.

For example, when the control unit 200 detects one of the objects OBJ in the interactive content IAC1 being touched by the co-pilot PS, the control unit 200 may slide the object OBJ from the second display device 112 to be displayed on the first display device 111 (as shown in FIG. 11A and FIG. 11B), allowing the driver DR to confirm. If the object OBJ displayed on the first display device 111 is not touched within a determined time (such as 10 seconds), or the driver DR touches the object OBJ displayed on the first display device 111 within the determined time, the control unit 200 may slide the object OBJ from the first display device 111 to be displayed on the second display device 112 (as shown in FIG. 11B and FIG. 11C).

Figure 12A:
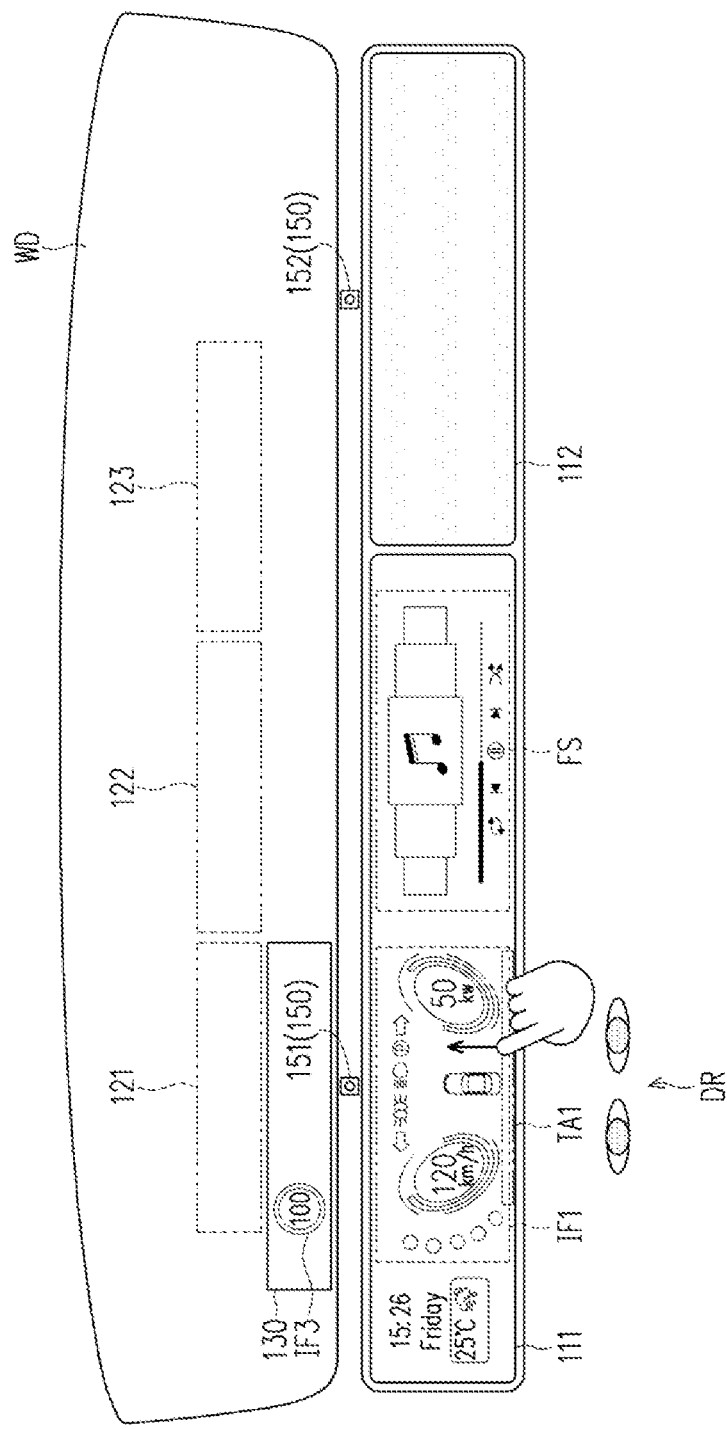
FIG. 12A to FIG. 12C are flowcharts of the multi-screen cockpit display system of FIG. 1 in a sixth scenario.
Figure 12B:
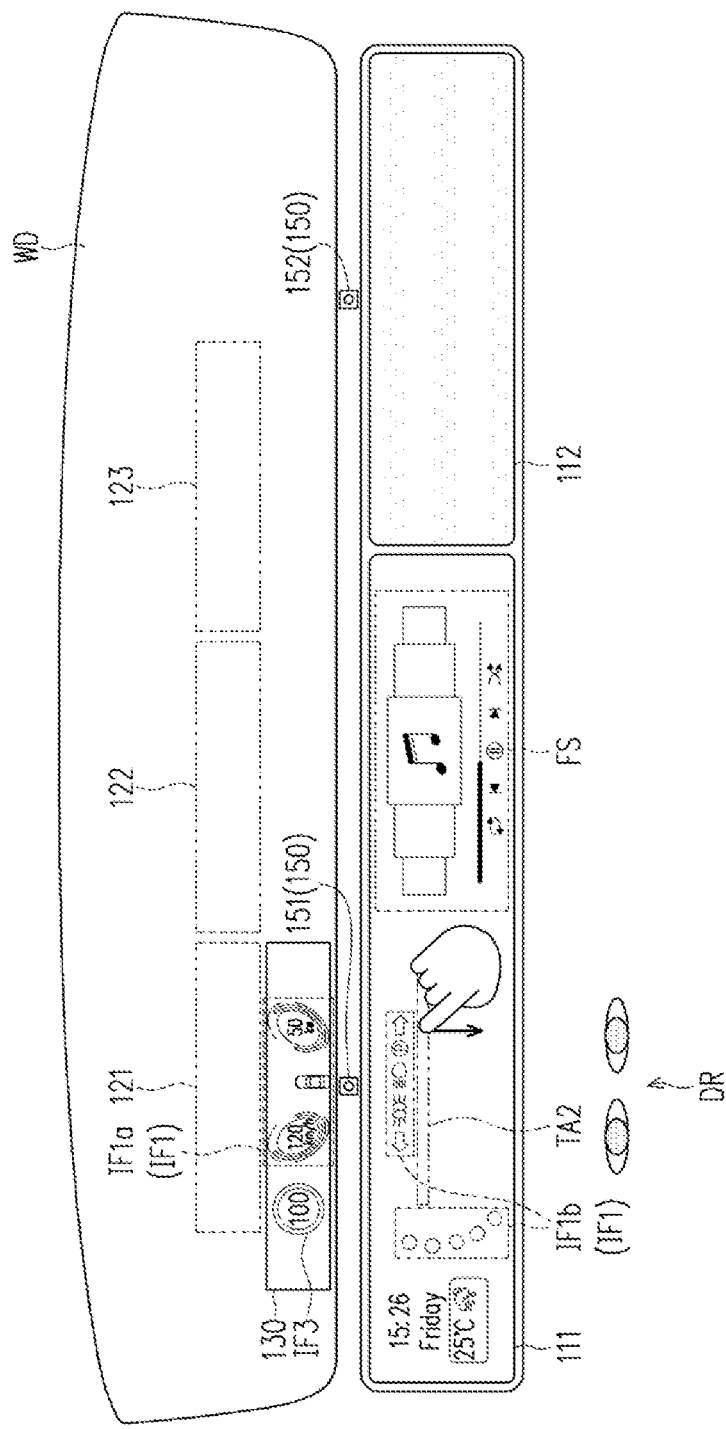
Figure 12C:
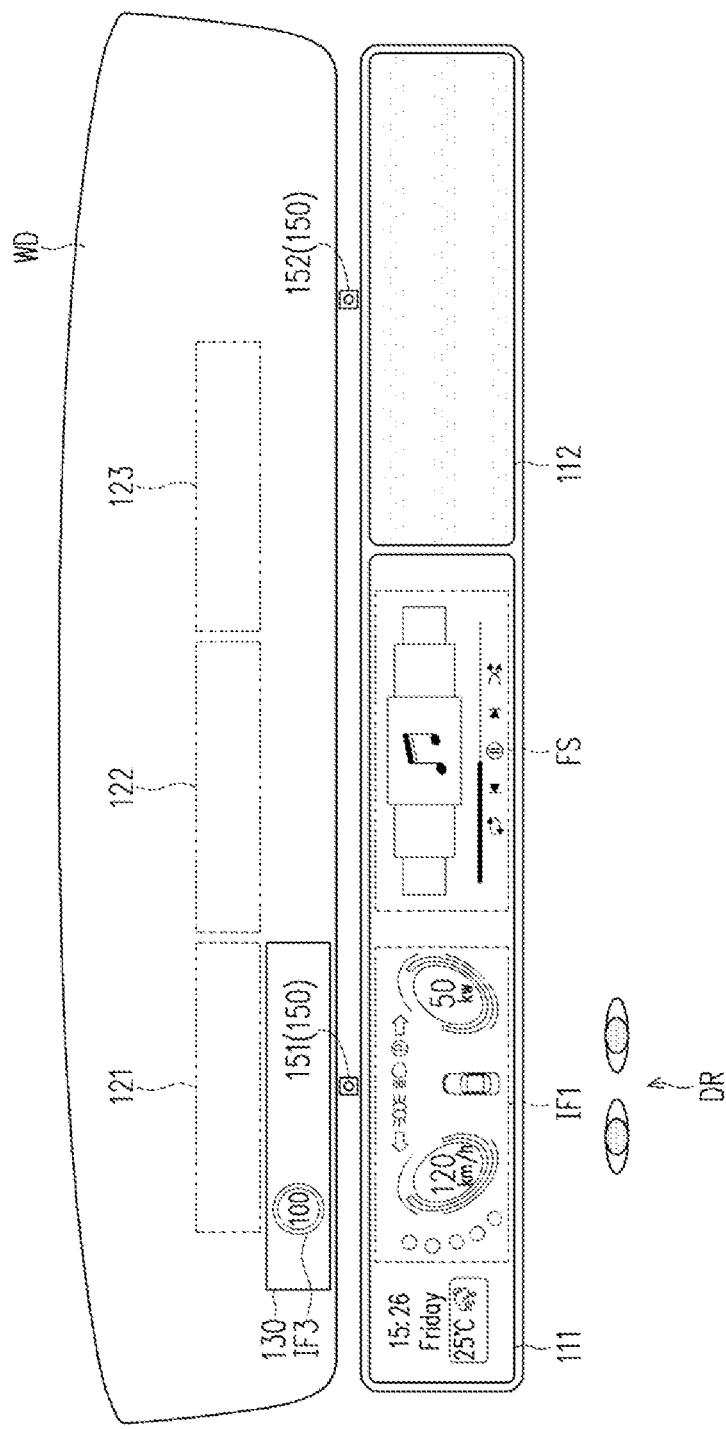

FIG. 12A to FIG. 12C are flowcharts of the multi-screen cockpit display system of FIG. 1 in a sixth scenario. Referring to FIG. 3, FIG. 12A and FIG. 12B, when the control unit 200 detects a touch action sliding toward the self-luminous display device 130 (that is, sliding upward) by a first touch area TA1 of the first display device 111, the control unit 200 may display a part of dynamic information IF1a of the first dynamic information IF1 on the self-luminous display device 130, and the other part of dynamic information IF1b of the first dynamic information IF1 remains being displayed on the first display device 111. The dynamic information IF1a includes, for example, vehicle speed and power consumption, without being limited thereto.

Referring to FIG. 3, FIG. 12B and FIG. 12C, when the control unit 200 detects another touch action sliding toward a direction away from the self-luminous display device 130 (that is, sliding downward) by a second touch area TA2 of the first display device 111, the control unit 200 may let the dynamic information IF1a disappear from the self-luminous display device 130 and be displayed on the first display device 111.

In sum, in the multi-screen cockpit display system according to one embodiment of the present disclosure, the first display device disposed in front of the driver's seat and the at least two head-up display devices above are driven by the same control unit. Thus, the information transfer between the display devices is convenient, and the operation is intuitive. In addition, the at least two head-up display devices disposed to overlap with the see-through window may further provide the user with a better immersive experience. In the multi-screen cockpit display system according to another embodiment of the present disclosure, the eye tracking module is utilized to obtain the visual direction of the user, thereby dynamically adjusting the content display effect of the human-machine interactive interface, which helps enhance the interface experience of the user.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A multi-screen cockpit display system, configured to be installed in a cockpit, the multi-screen cockpit display system comprising:
    a first display device, disposed in front of a driver's seat in the cockpit, and configured to display a first dynamic information;
    an eye tracking module, disposed corresponding to the driver's seat, and configured to detect a visual direction of a driver on the driver's seat;
    at least two head-up display devices, disposed above the first display device, and configured to display a second dynamic information on a see-through window of the cockpit;
    a control unit, electrically connected to the first display device and the at least two head-up display devices, wherein the control unit is configured to provide the first dynamic information and the second dynamic information to the first display device and the at least two head-up display devices according to an operating state of the cockpit; and
    a second display device, disposed in front of a passenger seat in the cockpit, and electrically connected to the control unit, wherein the second display device is configured to display a multimedia image,
    wherein when the visual direction of the driver passes through the second display device, the control unit activates a privacy mode on the second display device, preventing the driver from seeing the multimedia image displayed on the second display device.

2. The multi-screen cockpit display system according to claim 1, further comprising:
    a self-luminous display device, disposed to overlap with the see-through window, and configured to display a third dynamic information, wherein the control unit is electrically connected to the self-luminous display device.

3. The multi-screen cockpit display system according to claim 2, wherein the self-luminous display device is located between the at least two head-up display devices and the first display device.

4. The multi-screen cockpit display system according to claim 2, wherein the self-luminous display device is further configured to display at least part of the first dynamic information.

5. The multi-screen cockpit display system according to claim 4, wherein when the control unit detects a touch action sliding toward the self-luminous display device by a first touch area of the first display device, the control unit switches the at least part of the first dynamic information from the first display device to be displayed on the self-luminous display device.

6. The multi-screen cockpit display system according to claim 5, wherein when the control unit detects another touch action sliding toward a direction away from the self-luminous display device by a second touch area of the first display device, the control unit switches the at least part of the first dynamic information from the self-luminous display device to be displayed on the first display device.

7. The multi-screen cockpit display system according to claim 1, wherein the at least two head-up display devices comprise a first head-up display device, a second head-up display device and a third head-up display device, and the first head-up display device, the second head-up display device and the third head-up display device display the second dynamic information in a stitching manner.

8. The multi-screen cockpit display system according to claim 1, further comprising:
    an eye tracking module, disposed corresponding to the driver's seat, and configured to detect a binocular position of a driver on the driver's seat, wherein the control unit is configured to adjust a display position of the second dynamic information on the at least two head-up display devices according to the binocular position.

9. The multi-screen cockpit display system according to claim 1,
    wherein the first display device is further configured to display a plurality of functional icons, and when the driver gazes on the functional icons, the control unit is configured to adjust the functional icons according to the binocular position obtained by the eye tracking module, such that a normal direction of a virtual display surface of each of the functional icons being adjusted passes through the driver.

10. The multi-screen cockpit display system according to claim 9, wherein the functional icons being displayed on the first display device are arranged based on respective distances of the functional icons and the driver in an ascending order, and an included angle between the normal direction of the virtual display surface of each of the functional icons and a normal direction of a display surface of the first display device increases by the ascending order of the functional icons based on the respective distances of the functional icons and the driver.

11. The multi-screen cockpit display system according to claim 9, wherein when the driver gazes on one of the functional icons, the control unit is configured to enlarge a size of the one of the functional icons, and reduce sizes of others of the functional icons.

12. The multi-screen cockpit display system according to claim 11, wherein when the driver gazes on the one of the functional icons and nods, the control unit activates a functional page of the one of the functional icons.

13. The multi-screen cockpit display system according to claim 1,
wherein the second display device is configured to display an interactive content,
wherein any object in the interactive content is configured to be transferred from the second display device to be displayed on the first display device.

14. The multi-screen cockpit display system according to claim 13, wherein when a co-pilot on the passenger seat touches an object in the interactive content, the object slides from the second display device to be displayed on the first display device, and when a driver on the driver's seat touches the object on the first display device or when the object is not touched for a determined time, the object slides from the first display device to be displayed on the second display device.

15. The multi-screen cockpit display system according to claim 1, wherein after the second display device operates in the privacy mode for a determined time, the control unit deactivates the privacy mode.

16. A multi-screen cockpit display system, configured to be installed in a cockpit, the multi-screen cockpit display system comprising:
a first display device, disposed in front of a driver's seat in the cockpit, and configured to display a first dynamic information;
an eye tracking module, disposed corresponding to the driver's seat and a passenger seat in the cockpit, and configured to detect a visual direction of a driver on the driver's seat or a co-pilot on the passenger seat; and
a control unit, electrically connected to the first display device and the eye tracking module; and
a second display device, disposed in front of a passenger seat in the cockpit, and electrically connected to the control unit, wherein the second display device is configured to display a multimedia image,
wherein the first display device is further configured to display a plurality of functional icons, and when the driver gazes on the functional icons, the control unit is configured to adjust the functional icons according to the binocular position obtained by the eye tracking module, such that a normal direction of a virtual display surface of each of the functional icons being adjusted passes through the driver.

17. The multi-screen cockpit display system according to claim 16, wherein the functional icons being displayed on the first display device are arranged based on respective distances of the functional icons and the driver in an ascending order, and an included angle between the normal direction of the virtual display surface of each of the functional icons and a normal direction of a display surface of the first display device increases by the ascending order of the functional icons based on the respective distances of the functional icons and the driver.

18. The multi-screen cockpit display system according to claim 16, wherein when the driver gazes on one of the functional icons, the control unit is configured to enlarge a size of the one of the functional icons, and reduce sizes of others of the functional icons.

19. A multi-screen cockpit display system, configured to be installed in a cockpit, the multi-screen cockpit display system comprising:
a first display device, disposed in front of a driver's seat in the cockpit, and configured to display a first dynamic information;
at least two head-up display devices, disposed above the first display device, and configured to display a second dynamic information on a see-through window of the cockpit;
a control unit, electrically connected to the first display device and the at least two head-up display devices, wherein the control unit is configured to provide the first dynamic information and the second dynamic information to the first display device and the at least two head-up display devices according to an operating state of the cockpit; and
a second display device, disposed in front of a passenger seat in the cockpit, and electrically connected to the control unit, wherein the second display device is configured to display an interactive content,
wherein any object in the interactive content is configured to be transferred from the second display device to be displayed on the first display device;
wherein when a co-pilot on the passenger seat touches an object in the interactive content, the object slides from the second display device to be displayed on the first display device, and when a driver on the driver's seat touches the object on the first display device or when the object is not touched for a determined time, the object slides from the first display device to be displayed on the second display device.

20. The multi-screen cockpit display system according to claim 19, wherein the at least two head-up display devices comprise a first head-up display device, a second head-up display device and a third head-up display device, and the first head-up display device, the second head-up display device and the third head-up display device display the second dynamic information in a stitching manner.

* * * * *